(12) United States Patent
Steffanson et al.

(10) Patent No.: US 10,876,899 B2
(45) Date of Patent: Dec. 29, 2020

(54) APPARATUS AND METHOD TO ADJUST SENSITIVITY IN MEASURING ELECTROMAGNETIC RADIATION USING MICRO MIRRORS

(71) Applicant: MP High Tech Solutions Pty Ltd, Eveleigh (AU)

(72) Inventors: Marek Steffanson, Mosman (AU); Gabrielle de Wit, Pymble (AU); Donald James Bone, Wentworth Falls (AU); Mark Halstead, Auckland (NZ)

(73) Assignee: MP High Tech Solutions Pty Ltd, Eveleigh (AU)

( * ) Notice: Subject to any disclaimer, the term of this patent is extended or adjusted under 35 U.S.C. 154(b) by 45 days.

(21) Appl. No.: 16/222,961

(22) Filed: Dec. 17, 2018

(65) Prior Publication Data
US 2019/0186999 A1    Jun. 20, 2019

Related U.S. Application Data

(60) Provisional application No. 62/607,181, filed on Dec. 18, 2017.

(51) Int. Cl.
*G01J 5/08* (2006.01)
*G01J 5/10* (2006.01)
(Continued)

(52) U.S. Cl.
CPC .......... *G01J 5/0809* (2013.01); *G01J 5/0803* (2013.01); *G01J 5/0806* (2013.01); *G01J 5/0831* (2013.01);
(Continued)

(58) Field of Classification Search
CPC ...... G01J 5/0809; G01J 5/0803; G01J 5/0806; G01J 5/0831; G01J 5/0853; G01J 5/0896; G01J 5/10; G01J 5/40; G01J 2005/0077
See application file for complete search history.

(56) References Cited

U.S. PATENT DOCUMENTS 5,929,440 A * 7/1999 Fisher .................. G01J 5/40
250/332
7,995,849 B2    8/2011 Raveendran et al.
(Continued)

OTHER PUBLICATIONS

International Search Report and Written Opinion, PCT/US2018/066202, dated Apr. 4, 2019.
(Continued)

*Primary Examiner* — Christine S. Kim
(74) *Attorney, Agent, or Firm* — Greenberg Traurig

(57) ABSTRACT

Systems, methods, and apparatuses having an array of micro mirrors that rotate according to absorbed radiation and reflect light to generate light spots. In a first setting, a processor obtains an image of the light spots, determines positions of the light spots using a computationally efficient but less accurate method to calculate the intensities of radiation directed at the micro mirrors, and provides the calculated radiation. In a second setting, the processor does not determines the position; and the image is transmitted to a separate computing device to determine positions of the light spots using a computationally intensive but more accurate method to calculate the intensities of radiation directed at the micro mirrors. The system can dynamically switch between the first setting and second setting without a need to adjust hardware.

17 Claims, 20 Drawing Sheets

(51) Int. Cl.
  *G01J 5/00* (2006.01)
  *G01J 5/40* (2006.01)
(52) U.S. Cl.
  CPC ........... *G01J 5/0853* (2013.01); *G01J 5/0896* (2013.01); *G01J 5/10* (2013.01); *G01J 5/40* (2013.01); *G01J 2005/0077* (2013.01)

(56) References Cited

U.S. PATENT DOCUMENTS

| | | | |
|---|---|---|---|
| 2004/0208392 | A1 | 10/2004 | Raveendran et al. |
| 2013/0188043 | A1* | 7/2013 | Decoster ............... G01S 7/4814 348/135 |
| 2015/0022813 | A1 | 1/2015 | Kousalik et al. |
| 2015/0377711 | A1* | 12/2015 | Steffanson ............ G01J 5/0806 250/349 |
| 2017/0318099 | A1 | 11/2017 | Tolmachev |
| 2020/0096639 | A1* | 3/2020 | Panas ..................... G06K 9/209 |

OTHER PUBLICATIONS

Yan Wan, Suna Yin, "Three-Dimensional Curve Fitting Based on Cubic B-Spline Interpolation Curve." The 2014 7th Congress on Image and Signal Processing, 2014.

* cited by examiner

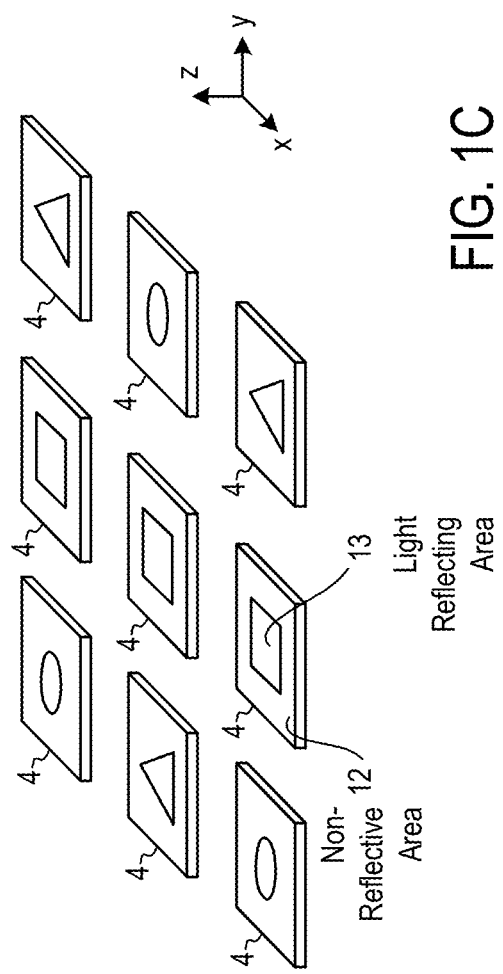

US 10,876,899 B2

APPARATUS AND METHOD TO ADJUST SENSITIVITY IN MEASURING ELECTROMAGNETIC RADIATION USING MICRO MIRRORS

RELATED APPLICATIONS

The present application claims the benefit of the filing date of Prov. U.S. Pat. App. Ser. No. 62/607,181, filed Dec. 18, 2017 and entitled "Apparatus and Method to Adjust Sensitivity in Measuring Electromagnetic Radiation using Micro Mirrors," the entire disclosure of which application is hereby incorporated herein by reference.

The present application relates to U.S. patent application Ser. No. 14/750,403, filed Jun. 25, 2015 and entitled "Apparatus and Method for Electromagnetic Radiation Sensing", which claims priority to Prov. U.S. Pat. App. Ser. No. 62/017,724, filed Jun. 26, 2014 and entitled "Apparatus and Method for Electromagnetic Radiation Sensing", the entire disclosures of which applications are hereby incorporated herein by reference.

FIELD OF THE TECHNOLOGY

At least some embodiments disclosed herein relate to electromagnetic radiation detection in general and more particularly but not limited to the sensing of infrared (IR) radiation.

BACKGROUND

U.S. Pat. No. 5,929,440 discloses an electromagnetic radiation detector that has an array of multi-layered cantilevers. Each of the cantilevers is configured to absorb electromagnetic radiation to generate heat and thus bend under the heat proportionately to the amount of absorbed electromagnetic radiation. The cantilevers are illuminated and light reflected by the bent cantilevers are sensed to determine the amount of electromagnetic radiation. The entire disclosure of U.S. Pat. No. 5,929,440 is hereby incorporated herein by reference.

BRIEF DESCRIPTION OF THE DRAWINGS

The embodiments are illustrated by way of example and not limitation in the figures of the accompanying drawings in which like references indicate similar elements.

FIG. 1C illustrates an array of micro mirrors having different light reflecting areas according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1A:
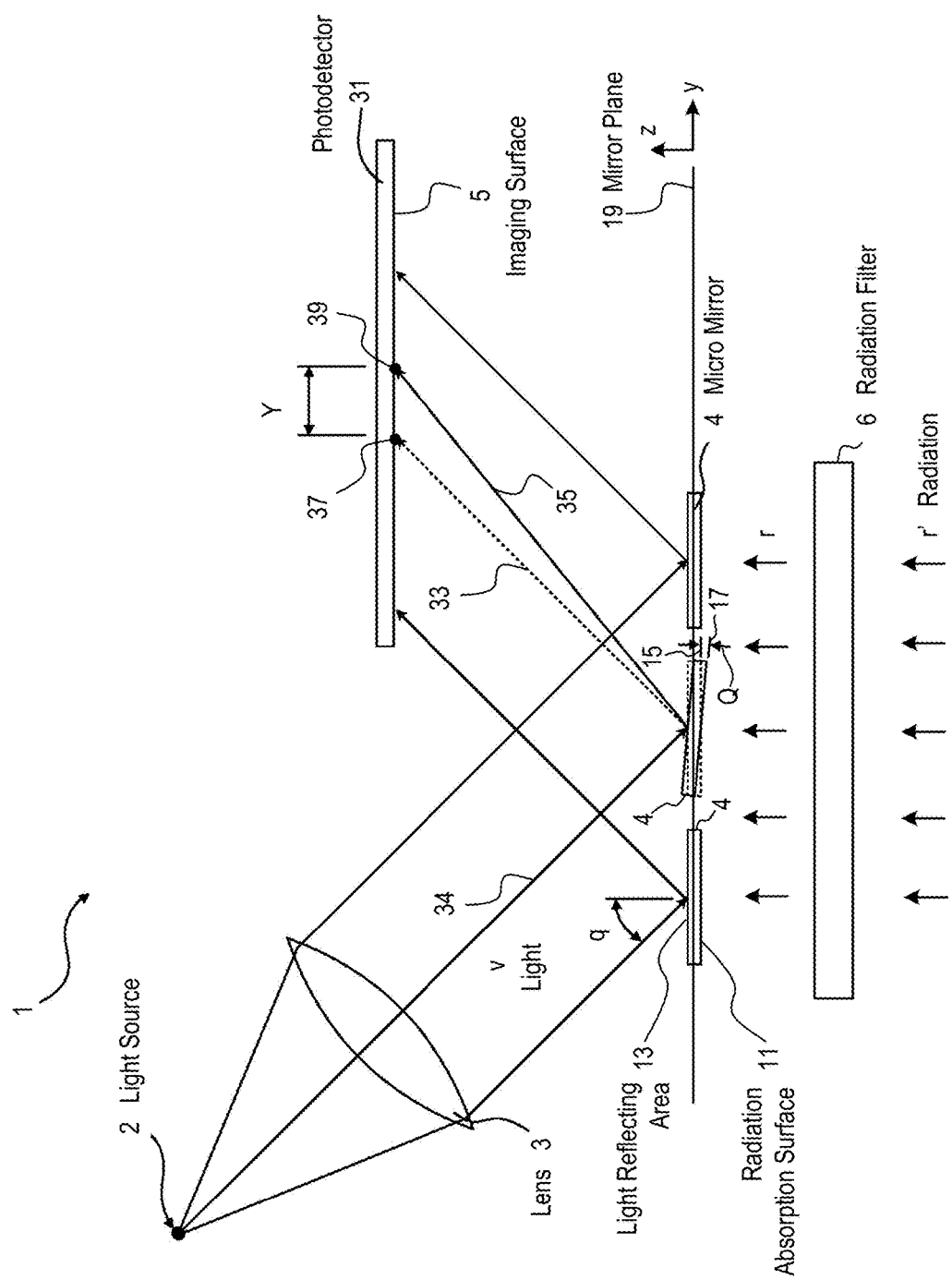
FIG. 1A illustrates an apparatus configured to measure a distribution of electromagnetic radiation according to one embodiment.

FIG. 1A illustrates an apparatus configured to measure a distribution of electromagnetic radiation according to one embodiment.

In FIG. 1A, an electromagnetic radiation sensing apparatus (1) includes an array of micro mirrors (4), a light source (2) to provide light, a lens (3) to direct the light (v) onto the light reflecting areas (13) of the micro mirrors (4), an imaging surface (5) to form an image of light spots reflected by the micro mirrors (4), a photodetector (31) to capture the image form on the imaging surface (5), and an optional radiation filter (6) to filter the incoming radiation (r') to generate a distribution of radiation (r) being absorbed by the radiation absorption surfaces (11) of the micro mirrors (4).

In FIG. 1A, the array of micro mirrors (4) is arranged on a mirror plane (19). For example, the centers of gravity (or geometry) of the micro mirrors (4) are positioned on the mirror plane (19). The imaging surface (5) is arranged in parallel with the mirror plane (19).

Each of the micro mirrors (4) has a radiation absorption surface (11) facing the radiation (r) and/or the radiation filter (6). Each of the micro mirrors (4) has a light reflecting area (13) formed on the opposite surface of the radiation absorption surface (11). The light reflecting area (13) functions as a mirror to reflect the light (v) onto the imaging surface (5). The portion of the light (v) reflected by a particular micro mirror (4) is generally distinct and separate from the portions of light (v) reflected by other micro mirrors (4) and thus form, on the imaging surface (5), a distinct light spot that is associated with the particular micro mirror (4).

For example, the light ray (34) from the light source (2) is reflected by the light reflecting area (13) of a micro mirror (4) to form a reflected light ray (35) reaching the light spot (39) on the imaging surface (5).

In FIG. 1A, in the absence of the incoming radiation (r'), the micro mirrors (4) have initially positions that can be aligned with the mirror plane (19). For example, the center planes of the micro mirror (4) are inside the mirror plane (19); and the radiation surfaces (11) of the micro mirrors (4) are in parallel with the mirror plane (19).

In FIG. 1A, the dotted line (33) represents the position of the light ray reflected by a corresponding micro mirror (4) in the initial dotted line position of the corresponding micro mirror (4). After the micro mirror (4) rotates from the dotted line position (15) to the solid line position (17), the light spot of the corresponding micro mirror (4) moves from the initial location (37) to the current location (39). The measurement of the light spot displacement (Y) between locations (37 and 39) can be used to compute the angle of the rotation Q of the corresponding micro mirror (4); and since the rotation Q can be proportionately a function of the radiation intensity on the radiation absorption surface (11) of the corresponding micro mirror (4), the measured displacement (Y) can be used to calculate the radiation intensity on the radiation absorption surface (11) of the corresponding micro mirror (4).

The measurement of the light spot displacement (Y) can be performed for each micro mirror (4) in the array and used to determine the distribution of the radiation intensity on the array of the micro mirrors (4).

In one embodiment, the photodetector (31) is used to capture the image formed on the imaging surface (5), identify the individual light spots corresponding to the individual micro mirrors (4) in the array, determine the locations of the light spots, and compute the displacements of the respective light spots and thus the light intensity of the radiation intensity on the mirror mirrors (4).

In FIG. 1A, the y-axis is in the direction of the row of micro mirrors (4) and is parallel to the image plane (19); and the light spot displacement (Y) is on the imaging surface (5) along the y-axis direction. The mirror plane (19) and the imaging surface (5) are separate by a distance along the z-axis that is perpendicular to the mirror plane (19).

In FIG. 1A, the light (v) is directed on the mirror plane (19) with an angle q with the z-axis. Thus, the light (v) generally travels along the direction of the row of micro mirrors (4) onto the mirror plane (19) and after being reflected by the mirror mirrors (4), onto the imaging surface (5) along the direction of the row of micro mirrors (4). The light directing device (e.g., the lens (3)) and the imaging surface (5) are separated apart by a distance along the direction of the row (y-axis). Thus, the light directing device (e.g., the lens (3)) does not interfere with light rays between the micro mirrors (4) and the imaging surface (5). In one embodiment, there are no structural and/or optical components on the light path between the micro mirrors (4) and the imaging surface (5). In another embodiment there can be structural and/or optical components on the light path between the micro mirrors (4) and the imaging surface (5), such as a partially transmissive and partially transparent plane to direct light onto the micro mirrors (4) or onto the imaging surface (5), or on both. Other components to direct light (v), or change the travel path of light (v), such collimator, diffraction gratings, beam splitter, etc. are possible.

In FIG. 1A, the imaging surface (5) is in parallel with the mirror plane (19). Thus, when the micro mirrors (4) are in the initial positions that are aligned with the mirror plane (19), the light reflected by different micro mirrors (4) in the array travels equal distances from the respective light reflecting areas (13) of the micro mirrors (4) to the imaging surface (5). As a result, equal rotations of the micro mirrors (4), due to equal radiation (r) intensity applied on the radiation absorption surfaces (11) of the micro mirrors (4), can result in equal light spot displacement (Y) on the imaging surface (5). This arrangement can simplify the calibration for computing the light intensity from the light spot displacement (Y) and/or improve accuracy and/or ensure uniform signal generation and uniform sensitivity in the conversion from radiation intensity to light spot displacement.

Figure 1B:
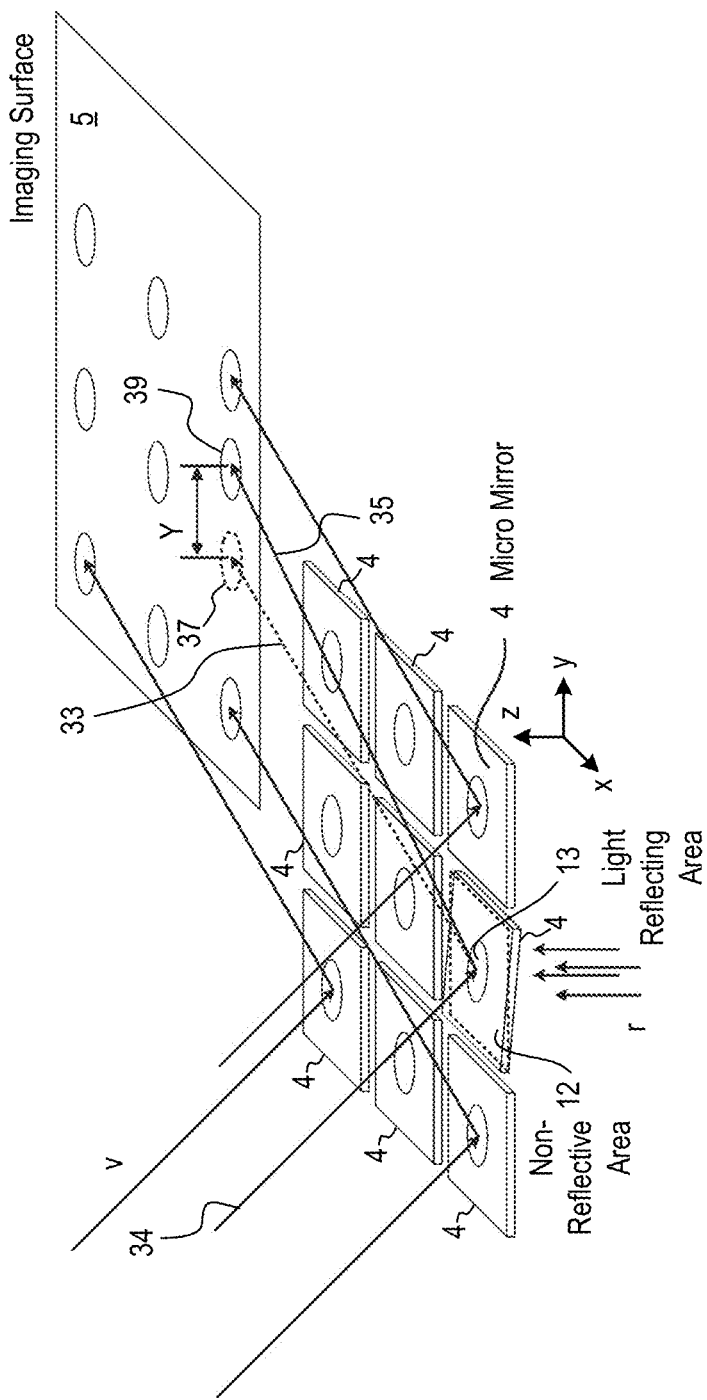
FIG. 1B illustrates the measuring of displacements of reflected light spots on an imaging surface to determine the intensity of electromagnetic radiation at the location of micro mirrors according to one embodiment.

FIG. 1B illustrates the measuring of displacements of reflected light spots on an imaging surface to determine the intensity of electromagnetic radiation at the location of micro mirrors according to one embodiment.

FIG. 1B illustrates an array of 3×3 micro mirrors (4). In general, different numbers of rows and/or columns of micro mirrors (4) can be used in different applications.

FIG. 1B illustrates that each micro mirror (4) has a light reflecting area (13) and a non-reflective area (12) on the surface facing the imaging surface. The shape and size of the light reflecting area (13) of the each micro mirror (4) can define the light spot (39) reflected by the corresponding micro mirror (4) on to the imaging surface (5).

In FIG. 1B, the micro mirrors (4) in the array have the same shape and size in their light reflecting areas (13). Alternatively, different micro mirrors (4) in the array may have different shapes and/or sizes in their light reflecting areas (13), as illustrated in FIG. 1C, resulting different reflected light spots on the imaging surfaces. The different optical characteristics of the light reflecting areas (13) can be used to improve the accuracy in correlating the light spots on the imaging surface (5) with the corresponding micro mirrors (4) responsible for reflecting the light spots (39). Different optical characteristics can be achieved by using varying the shape, size, reflection rate, orientation, and/or polarization, etc. of the light reflecting areas (13). Further, symbols or graphical patterns can be applied (e.g., etched or overlaid) on the light reflecting areas (13) to mark the micro mirrors (4) such that the micro mirrors (4) responsible for generating the light spots on the imaging surface (5) can be identified from the shape, size, orientation, polarization, intensity and/or markers of the corresponding light spots captured on the imaging surface (5).

Similar to the arrangement in FIG. 1A, the micro mirrors (4) are arranged in a mirror plane formed by the x-axis and y-axis (x-y plane). The mirror plane and the imaging surface (5) are separate by a distance along the z-axis. The light rays (e.g., 34, 33, 35) can travel within the planes parallel to the y-axis and the z-axis or only parallel to each other. The parallel incoming rays (34) reflected by the light reflecting areas (13) of the micro mirrors (4) may or may not be parallel to each other when traveling from the light reflecting areas (13) to the imaging surface (5), depending on the rotations of the micro mirrors (4). When the micro mirrors (4) have the same amount of rotation (e.g., due to the uniform radiation (r)), the reflected lights can be parallel to each other and causes the equal light spot displacement (Y), as illustrated in FIG. 2A.

Figure 2A:
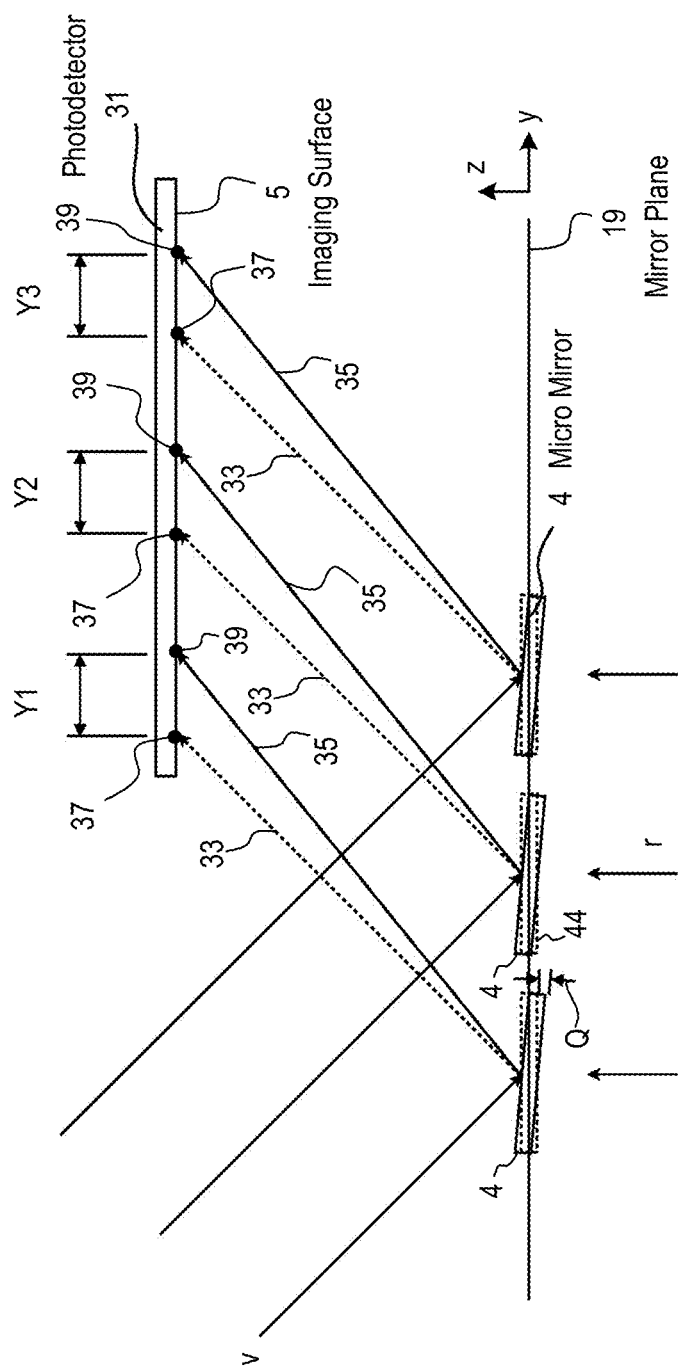
FIG. 2A illustrates a configuration of micro mirrors and an imaging surface to produce equal displacements of reflected light spots on an imaging surface for equal rotations of micro mirrors according to one embodiment.

FIG. 2A illustrates a configuration of micro mirrors and an imaging surface to produce equal displacements of reflected light spots on an imaging surface for equal rotations of micro mirrors according to one embodiment. Equal displacements represent equal sensitivity of the micro mirrors (4) in converting the radiation to light spot displacements.

In FIG. 2A, the imaging surface (5) is in parallel with the mirror plane (19). In absence of the radiation (r), the micro mirrors (4) are aligned in the mirror plane (19), as indicated by the dotted lines (44); and the reflected lights (33) generated by the parallel incoming light (v) are also parallel to each other between the micro mirrors (4) and the imaging surface (5), creating on the imaging surface (5) light spots that have spacing corresponding to the spacing of the micro mirrors (4).

In FIG. 2A, when the uniform radiation (r) causes the uniform rotation (Q) of the micro mirrors (4), the micro mirrors (4) tilt with an angle Q out of the mirror plane (19), as indicated by the solid lines (4); and the reflected lights (35) generated by the parallel incoming light (v) are also parallel to each other between the micro mirrors (4) and the imaging surface (5), creating uniform light spot displacements (Y1, Y2, Y3) on the imaging surface (5). The uniform light spot displacements (Y1, Y2, Y3) can correspond to the uniform radiation (r) provided on the absorption surface (11) of the micro mirrors (4).

In FIG. 2A, non-uniform radiation (r) provided on the absorption surface (11) of the micro mirrors (4) generally causes different mirror rotations (Q) and different light spot displacements (Y1, Y2, Y3).

Figure 2B:
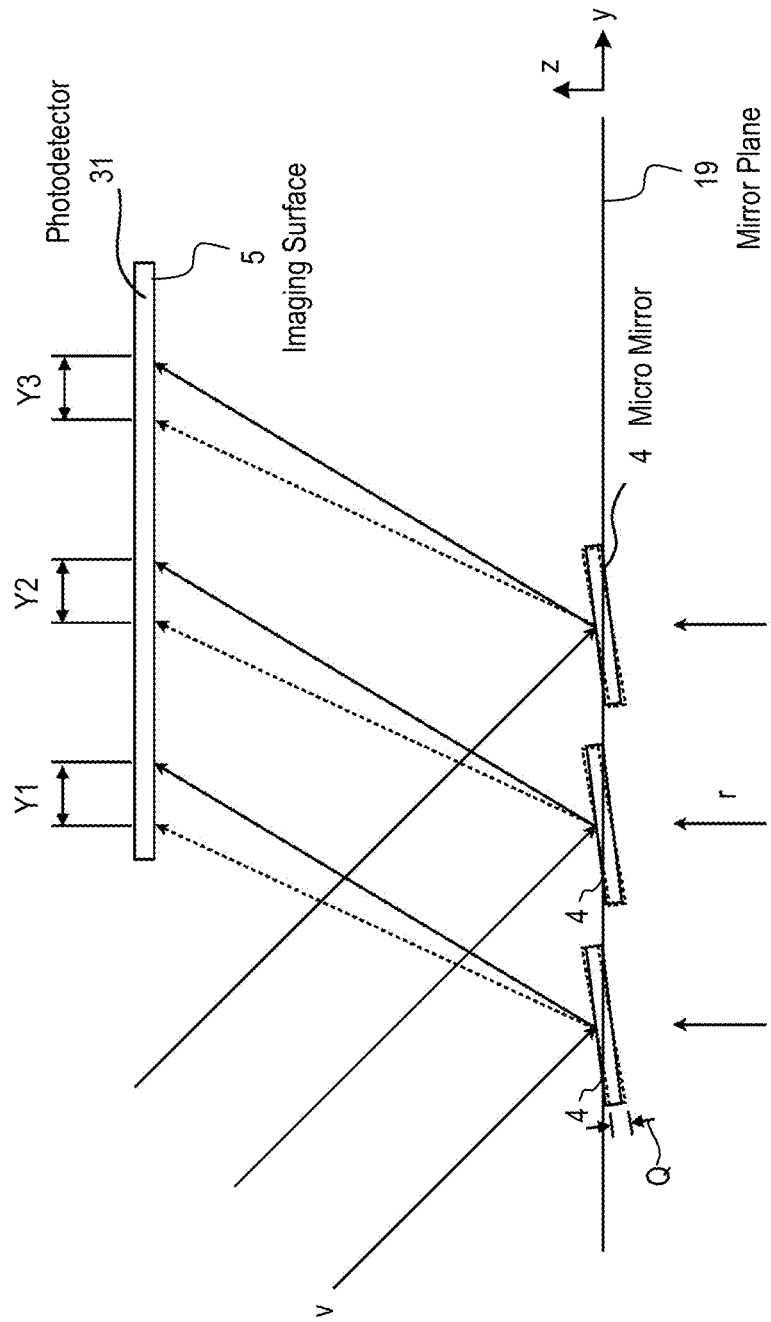
FIG. 2B illustrates another configuration of micro mirrors and an imaging surface to produce equal displacements of reflected light spots on an imaging surface for equal rotations of micro mirrors according to one embodiment.

FIG. 2B illustrates another configuration of micro mirrors and an imaging surface to produce equal displacements of reflected light spots on an imaging surface for equal rotations of micro mirrors according to one embodiment.

In FIG. 2B, in absence of the radiation (r), the micro mirrors (4) are not aligned in the mirror plane (19), as indicated by the dotted lines (44), but can have the an initial out-of-plane rotation relative to the mirror plane (19); and, the reflected lights (33) generated by the parallel incoming light (v) can be also parallel to each other between the micro mirrors (4) and the imaging surface (5), creating on the imaging surface (5) light spots that have spacing corresponding to the spacing of the micro mirrors (4) on the mirror plane (19). In another embodiment the the micro mirrors (4) do not have to have same initial out-of-plane rotation relative to the mirror plane (19), but each micro mirror (4) can have a different, however similar initial out-of-plane rotation, whilst the center of gravity of each micro mirror (4) lies substantially within the mirror plane (19).

Similar to FIG. 2A, when the uniform radiation (r) causes the uniform rotation (Q) of the micro mirrors (4) in FIG. 2B, the micro mirrors (4) tilt with an angle Q relative to their initial positions out of the mirror plane (19), as indicated by the solid lines (4); and the reflected lights (33) generated by the parallel incoming light (v) are also parallel to each other between the micro mirrors (4) and the imaging surface (5), creating uniform light spot displacements (Y1, Y2, Y3) on the imaging surface (5). The uniform light spot displacements (Y1, Y2, Y3) correspond to the uniform radiation (r) provided on the absorption surface (11) of the micro mirrors (4).

Figure 2C:
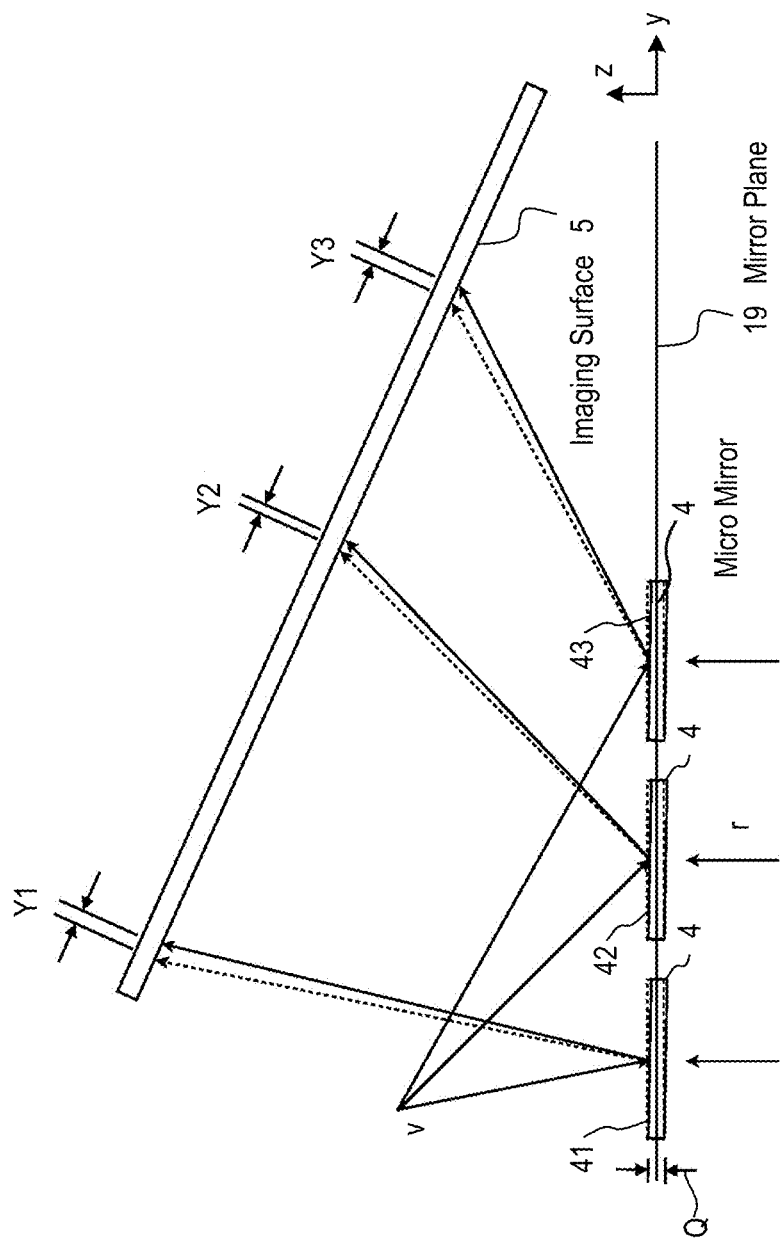
FIG. 2C illustrates a further configuration of micro mirrors and an imaging surface to produce minimal displacements deviation of reflected light spots on an imaging surface for equal rotations of micro mirrors upon non-collimated illumination according to one embodiment.

FIG. 2C illustrates a further configuration of micro mirrors and an imaging surface to produce minimal displacements deviation of reflected light spots on an imaging surface for equal rotations of micro mirrors upon non-collimated illumination according to one embodiment.

In FIG. 2C, the mirror plane (19) and the imaging surface (5) are not parallel to each other. The projection of the incoming light rays (v) on to the micro mirrors (4) is not parallel. Such non-collimated projection can be created with a point light source or through a beam splitter, or through a misaligned collimator. Further such projection can be created without utilizing any lenses between the point source and the micro mirrors (4). A non-collimated projection will result in a different illumination angle (angle of incident) of each micro mirror (41, 42, 43). Hence a spatial arrangement between the micro mirror plane (19) and the imaging surface (5), where same rotations (Q) of the micro mirrors (4) will generally result in different light spot displacements (Y1, Y2, Y3). However, preferably the micro mirror plane (19) and the imaging surface (5) are arranged such that with corresponding projection angles of the incoming light rays (v) on to the micro mirrors (4) when the micro mirrors (4) have the same rotation (Q) of a predetermined amount (e.g., 1 degree rotation from the unradiated mirror position), the corresponding light spot displacements of the two outermost micro mirrors (41 and 43) of a row (or at least three outermost corner micro mirrors in an array) (Y1, Y3) can be substantially equal to each other. Hence, when uniform radiation (r) causes the uniform rotation (Q) of the micro mirrors (4), the light spot displacement of any micro mirrors between the two outermost micro mirrors (41 and 43) in a row will can be smaller than the two substantially equal light spot displacements of the two outermost micro mirrors (41 and 43). Such arrangement minimizes light spot displacement deviations when uniform radiation (r) causes the uniform rotation (Q) of the micro mirrors (4) that are illuminated with non-collimated light.

Preferably, the micro mirrors (41 and 43) located at the beginning and the end of the row of micro mirrors (4) have the same light spot displacements (Y1 and Y3) when the micro mirrors (41 and 43) rotate the same amount (e.g., 1 degree) from the unradiated mirror position (dotted line positions). Such configuration can be achieved when the two outermost micro mirrors (41 and 43) in a row have substantially equal light spot displacements upon a rotation of the same amount (e.g., 1 degree). In one embodiment, at least three outermost micro mirrors (4) (e.g., located at the corners of the array in the mirror plane (19) are configured to have substantially equal light spot displacements upon a rotation of a predetermined amount (e.g., 1 degree).

More preferably, the micro mirrors (41, 42 and 43) located at the beginning, in the middle, and at the end of the row of micro mirrors (4) have the most minimal light spot displacements deviation (Y1, Y2 and Y3) when the micro mirrors (41, 42, and 43) rotate the same amount (e.g., 1 degree) from the unradiated mirror position (dotted line positions). Such configuration can be achieved when the two outermost micro mirrors (41 and 43) in a row are configured to have substantially equal light spot displacements upon a rotation of a predetermined amount (e.g., 1 degree). Micro mirrors (4) arranged in an array in the mirror plane (19) can have at least three outermost micro mirrors (e.g. corner) having substantially equal light spot displacements upon a rotation of the same amount (e.g., 1 degree).

FIG. 2C illustrates an example of adjusting the projection angle of the incoming rays (v) to minimize the light spot displacement deviations (Y1, Y2 and Y3) of the corresponding micro mirrors (41, 42 and 43). Alternatively, or in combination, the initial positions of the micro mirrors (4) can be configured to minimize the light spot displacement deviations (Y1, Y2 and Y3) for a predetermined amount of rotation caused by the same radiation provided on the respective micro mirrors (4).

Figure 3A:
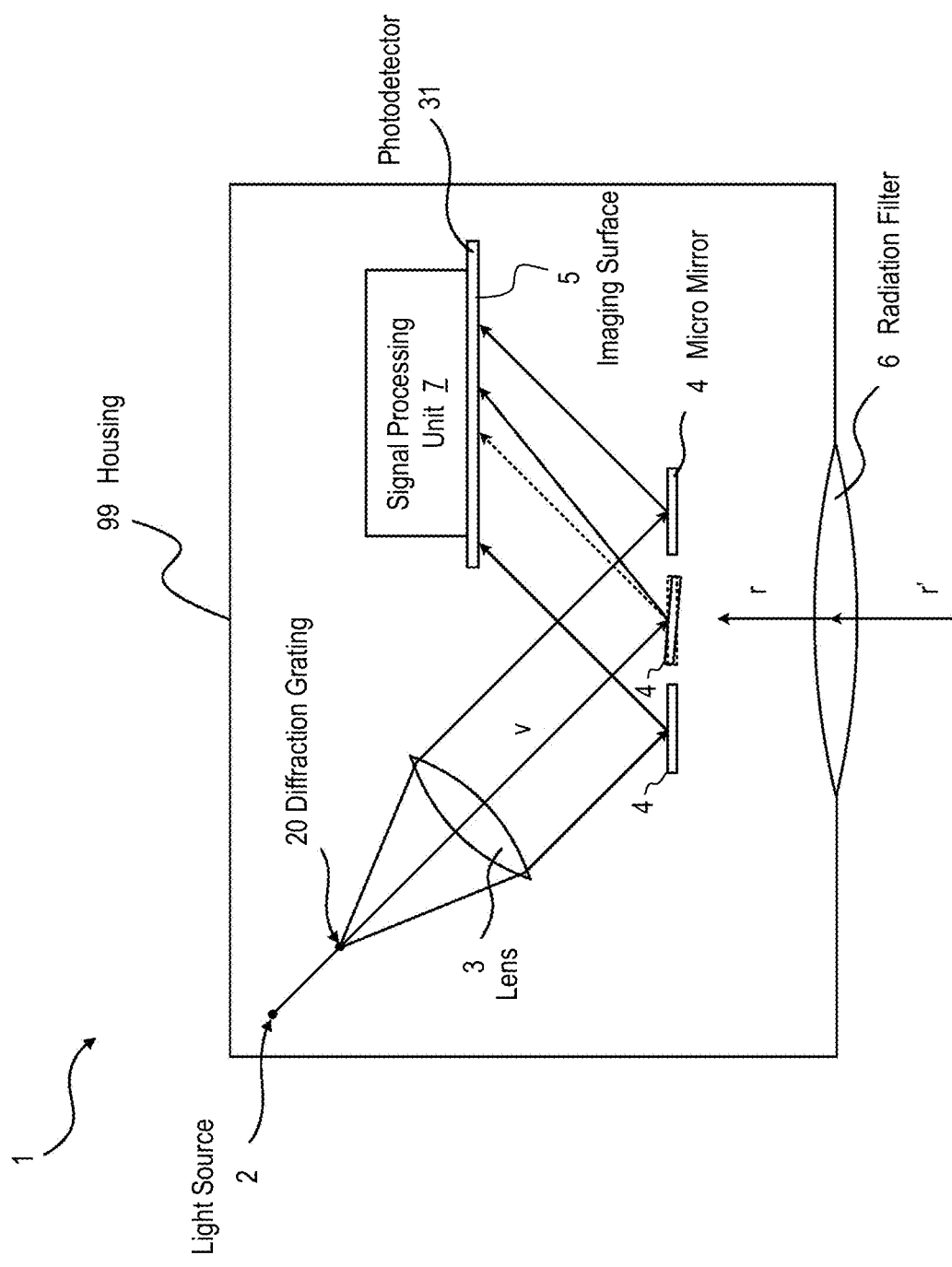
FIG. 3A illustrates a radiation sensing apparatus according to one embodiment.

FIG. 3A illustrates a radiation sensing apparatus according to one embodiment. The radiation sensing apparatus (1) illustrated in FIG. 3A has a housing (99) enclosing a light source (2), a diffraction grating (or a beam splitter) (20), a lens (3), an array of micro mirror (4), a photodetector (31) having an imaging surface (5), a signal processing unit (7) and a radiation filter (6).

In some embodiments, the radiation sensing apparatus (1) further includes a signal transmitting unit coupled with the signal processing unit (7) to transmit the image data captured by the photodetector (31) and/or the measuring data processed by the signal processing unit (7) indicating the light spot displacements (Y), the mirror rotations (Q) and the intensity of the radiation (r).

In FIG. 3A, the micro mirrors (4) and the imaging surface (5) are arranged to have ideally equal light spot displacements (or minimized displacement deviation) for equal mirror rotations caused by equal radiation intensity (e.g., as illustrated in FIGS. 2a, 2B, and 2C).

In FIG. 3A, the plane of the micro mirrors (4) and the imaging surface (5) are parallel to each other; and the diffraction grating (20) is disposed at the focal point of the lens (3) to direct parallel light rays (v) to the micro mirrors (4). When the micro mirrors (4) and the imaging surface (5) are arranged in an angle as illustrated in FIG. 2C, a point light source (2) (e.g., created via the diffraction grating (20)) may be used without the lens (3), or with the lens (3) where the diffraction grating (20) is not disposed at the focal point of the lens (3).

In one embodiment, the radiation filter (6) includes a radiation imaging lens (e.g., an infrared lens made of e.g., Germanium, Silicon, polymer, and the like). The radiation imaging lens is arranged in relation with the micro mirrors (4) to form an image of the radiation (e.g., infrared radiation) on the plane of the micro mirrors (4). Thus, the radiation intensity corresponding to the light spot displacement on the imaging surface (5) produced by a micro mirror (4) corresponds to the intensity of a pixel of the radiation image form via the radiation filter (6) at the location of the respective micro mirror (4).

Some of the figures, such as FIG. 1A, FIG. 2A, FIG. 2B, and FIG. 3A illustrate implementations where that the imaging surface (5) is arranged on a surface of the photodetector (31), some embodiments provide an imaging surface that is separate and/or remote to an imaging sensor configured to capture the image formed on the imaging surface.

Figure 3B:
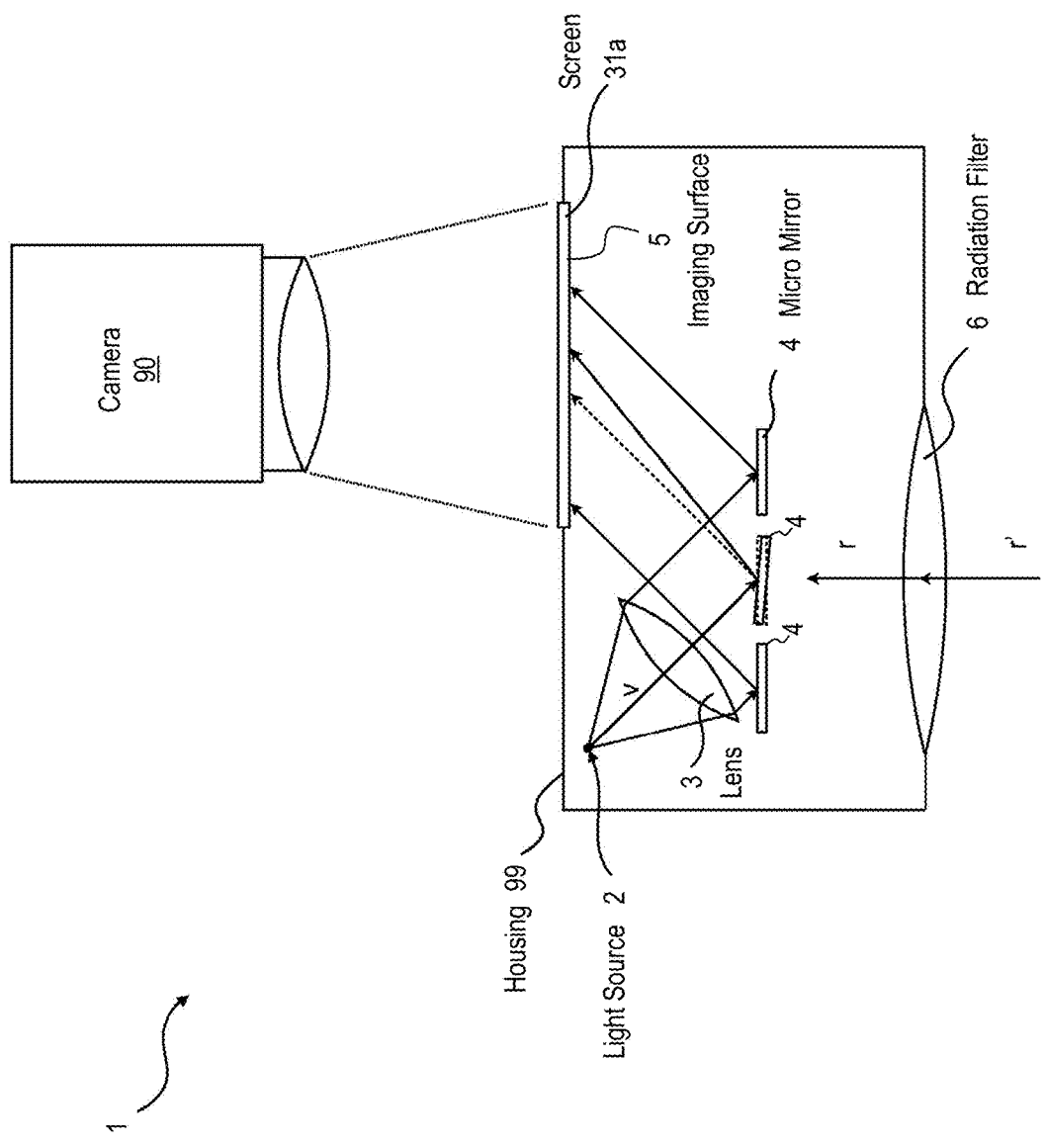
FIG. 3B illustrates another radiation sensing apparatus according to one embodiment.
Figure 3C:
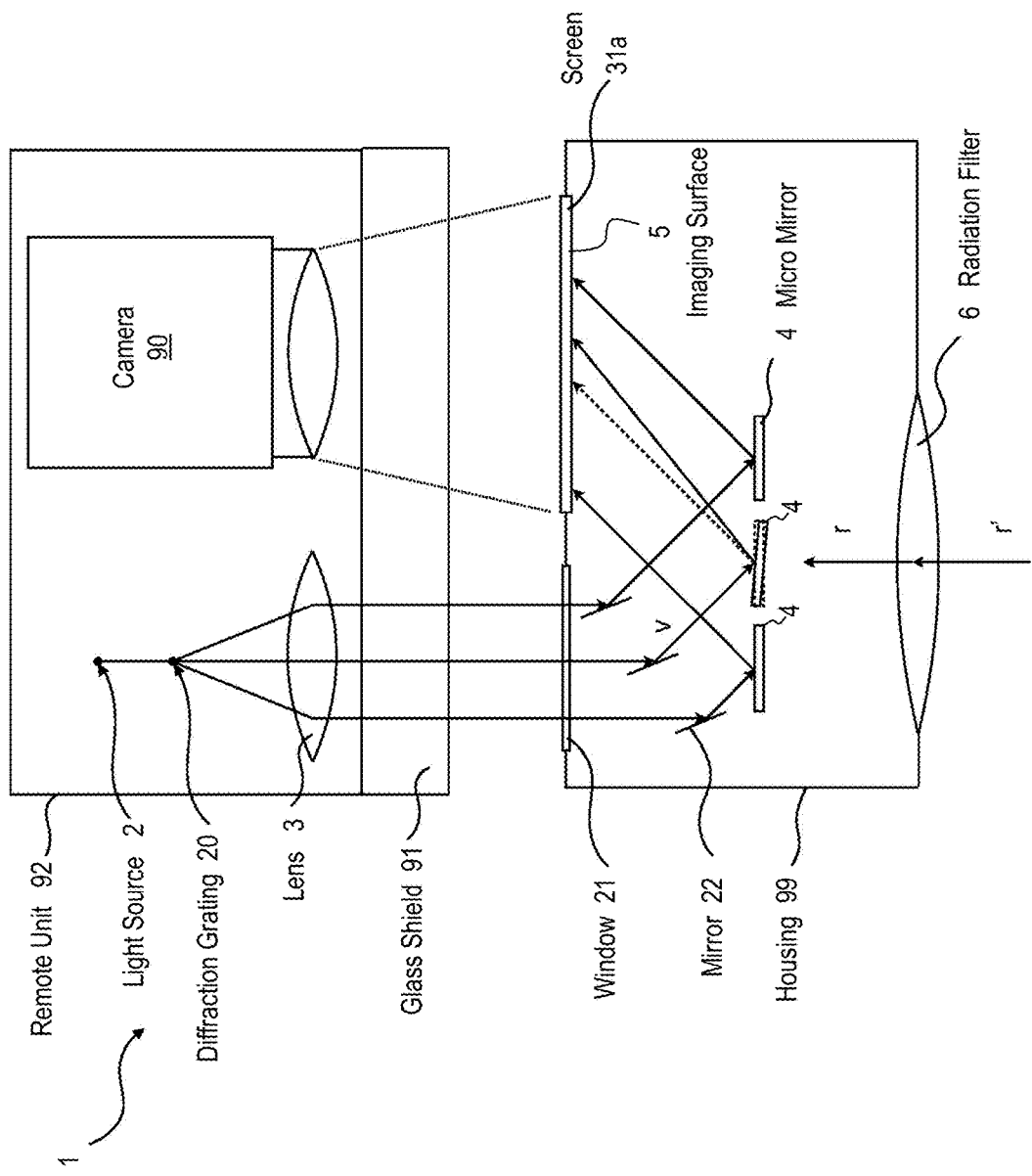
FIG. 3C illustrates a further radiation sensing apparatus according to one embodiment.

For example, the imaging surface can be implemented as a semi-transparent screen; and a remote camera can be used to photograph or record the light sport image formed on the semi-transparent screen from a distance to measure the light spot displacements (Y), as illustrated in FIGS. 3B and 3C.

FIG. 3B illustrates another radiation sensing apparatus according to one embodiment. In FIG. 3B, the radiation sensing apparatus has two separate units, including an imaging unit housed in housing (99) and a remotely positioned camera (90) configured to capture the light spot image formed on the imaging surface (5).

In FIG. 3B, the light spot image is formed on the imaging surface (5) of e.g. a semi-transparent screen (31a) mounted on a window of the housing (99).

Similarly to FIG. 3A, the housing (99) in FIG. 3B encloses a light source (2), a diffraction grating (20), a lens (3), an array of micro mirror (4), and a radiation filter (6). However, instead of having enclosing a photodetector (31) and a signal processing unit (7) in a way as illustrated in FIG. 3A, the housing (99) in FIG. 3B has a window to mount the semi-transparent screen (31a). The light spot image formed on the imaging surface (5) of the screen (31a) can be captured by the remote camera (90) for the determination of the light spot displacement (Y), the mirror rotation (Q), the intensity of the radiation (r).

In some embodiments, the remote camera (90) includes signal processing unit (7) configured to detect the light spots generated by the respective micro mirrors (4) from the photo image of the screen (31a) captured by the camera and compute the radiation intensity at the locations of the micro mirrors (4).

FIG. 3C illustrates a further radiation sensing apparatus according to one embodiment. In FIG. 3C, the remote unit (92) includes not only the camera (90), but also the light source (2), the diffraction grating (20) and lens (3), protected by a glass shield (91). Since the sensitive and/or costly elements are protected in a remote unit (92), the imaging unit housed in the house (99) can be used in a harsh environment.

In FIG. 3C, the housing (99) includes a window (21) to receive parallel light rays formed by the light source (2), the diffraction grating (20) and the lens (3) in the remote unit (92). A set of mirrors (22) is used to direct the parallel light rays onto the micro mirrors (4) to generate the light spot image on the imaging surface (5) of the semi-transparent screen (31a). The radiation filter (6) forms a radiation image on the radiation absorption surfaces (11) of the micro mirrors (4), which rotate proportionately to the absorbed radiation.

In FIG. 3C, the camera (90) is configured to capture the light spot image formed on the imaging surface (5) of the screen (31a).

FIG. 3C illustrates an example in which the screen (31a) is mounted on a window of the housing (99). Alternatively, the screen (31a) having the imaging surface (5) can be configured inside the housing (99) viewable through a transparent window (e.g., configured at the window where the screen (31a) is mounted in FIG. 3C).

FIG. 1C illustrates an array of micro mirrors having different light reflecting areas according to one embodiment. The different light reflecting areas (13) of different micro mirrors (4) causes the light spots (39) formed by the light (v) reflected by the respective micro mirrors (4) to have different shapes. Thus, ambiguities in identifying the light spots formed by different micro mirrors (4) can be resolved based on the association of the shapes of the micro mirrors (4) and the shapes of the light spots (39).

In FIG. 1C, different light reflecting areas (13) are configured to at least distinguish the light spots generated by the adjacent micro mirrors (4) in a row of micro mirrors (4) along the y-axis in the direction where the light spots travel the displacement (Y) in response to the rotation (Q) of micro mirrors (4) caused by the absorption of the energy of the radiation (r). In some implementations, each micro mirror (4) in a row of micro mirrors (4) is individualized with an optical marking such that the light spot generated by the respective micro mirror (4) can be distinguished from the light spots generated by other micro mirror (4) in the row. In general, the light spots of different rows of the micro mirrors (4) may also be optionally marked with different optical characteristics. Further, different optical characteristics of the light spots can also be created at least in part via the light directing component of the apparatus.

The radiation sensing apparatus discussed above have many applications, such as non-visual environment monitoring and monitoring of human presence for security and safety, energy savings, fire detection, people counting and behavior analysis. The radiation sensing apparatuses may use the infrared sensing technology in general and more particular uncooled thermal imaging.

In one embodiment, a radiation sensing apparatus includes a radiation detection sensor including a plurality of micromechanical radiation sensing pixels having a reflecting top surface and configured to deflect light incident on the reflective surface as a function of an intensity of sensed radiation. In some implementations, the apparatus can provide adjustable sensitivity and measurement range. In some implementations, the apparatus can provide adjustable spectral and multi-spectral sensing abilities. The apparatus can be utilized for human detection, fire detection, gas detection, temperature measurements, environmental monitoring, energy saving, behavior analysis, surveillance, information gathering and for human-machine interfaces.

Details of one or more implementations of the subject matter described in this specification are set forth in the accompanying drawings and the description. Other features, aspects, and advantages will become apparent from the description, the drawings, and the claims. Note that the relative dimensions of the following figures may not be drawn to scale. Like reference numbers and designations in the various drawings indicate like elements.

Non-visual environment monitoring and monitoring of human presence can be utilized in applications for security and safety, energy savings, fire detection, people counting and behavior analysis. One technology used for these kinds of applications is infrared technology, in particular uncooled thermal imaging. Every object in our environment has a unique thermal footprint and therefore thermal imaging offers detection of human presence in an enclosed environment with a very high accuracy and negligible false alarm rate. Human body temperature and emissivity in the long wave infrared band is in most cases distinguishably higher than the thermal footprint of typical indoor and outdoor environmental surroundings. Thermal imaging with a limited spatial resolution can be sufficient to accurately detect humans at short distances without revealing the individual's identity. This aspect of environmental and human detection and monitoring is of general interest with regards to privacy protection. Current thermal imaging technology solutions are inadequate for low-cost, high-volume applications due to their production complexity and expense. A need exists for ubiquitous limited spatial resolution infrared imagers at a commodity price. One example of a potentially inexpensive thermal imager with a limited spatial resolution is based on an uncooled thermo-mechanical bi-material microelement sensor, which converts incident infrared radiation into a micromechanical displacement. The microelement is often referred to as a micro-cantilever or micro-mirror. The operational principle is based on the bimaterial effect, where a material compound mismatch of coefficients of thermal expansion leads to a micromechanical motion upon temperature change. In some implementations one microelement represents one radiation sensing pixel and the entire sensors consists of an array of microelements.

Referring to FIG. 3A, the electromagnetic radiation detector 1 includes a housing (99) with a light source (2), a lens or collimator (3), an array of micro mirrors (4), a photodetector (31) with an imaging surface (5) and a radiation filter (6). Generally, the photodetector (5) converts light into electrical signals to detect the position of the light spots of generated by the lights reflected by the micro mirrors (4) that forms a micromechanical pixel array.

In one embodiment, each micro mirror (4) is a micromechanical radiation sensing pixel having a reflecting top surface and a radiation absorbing bottom surface. The micro mirrors (4) are arranged in a two-dimensional array. The micromechanical radiation sensing pixels exhibit a reversible micromechanical displacement of the reflecting top surface upon radiation absorption. The initial incident radiation passes through the filter (6) whereupon at least one characteristic of radiation is altered and the filtered radiation is provided on the micro mirror (4).

In some implementations the micromechanical pixel array of micro mirrors (4) can be enclosed in a specific operational pressure or gas sealing with transparent optical windows on the top and the bottom of the sealing chamber.

For example, the pixel disclosed in U.S. Pat. App. Ser. No. 62/004,805, filed May 29, 2014 and entitled "Micromechanical Devices for Electromagnetic Radiation Sensing and Methods to Produce the Same", can be used in the pixel array (4), the entire disclosure of which application is hereby incorporated herein by reference.

The light source (2) is illuminating the top surface of the micro mirrors (4) with light rays (v). The reflectors (e.g., the light reflecting area (13)) of the micromechanical radiation sensing pixels (e.g., the micro mirrors (4)) reflect the illuminated light rays (v) onto the imaging surface (5) of the photodetector (31). Between the light source (2) and the micro mirrors (4) is positioned a collimator or lens (3) which collimates and produces substantially parallel light rays (v) to fall onto the micro mirrors (4). The illumination of the topside of the micromechanical pixel array by the light rays (v) does not substantially influence, actuate, displace or rotate the reflectors of the micro mirrors (4). The reflectors of the micro mirrors (4) generate an angular motion primarily due to local temperature rise upon absorption of the radiation (r). The temperature dependent actuation of the micro mirror can be generally implemented via a bi-material effect for temperature sensing.

As illustrated in FIG. 1A, the collimated light rays as marked with (v) fall onto the reflectors of the micro mirrors (4) with a fixed angle of incidence q and are reflected with an angle of reflection and fall onto the imaging surface (5) of the photodetector (31). Initially the reflected light rays have substantially identical collimated arrangement as the incident light rays.

In the schematic illustration of FIG. 1B, an array of 3×3 micromechanical pixels is demonstrated as a sensor array. More or less pixels can be used in various embodiments. In FIG. 1B, a micro mirror (4) exhibits an angular displacement upon backside irradiation with radiation intensity r. In some implementations the amount of the tilt of the micro mirror (4) corresponds to the amount of absorbed radiation intensity. The micromechanical motion of the micro mirror (4) of the corresponding pixel is generated by absorption of irradiated electromagnetic radiation from the bottom side. The absorbed irradiation generates a temperature increase on the micro-structure, where a bi-material actuator induces an angular micromechanical motion.

Due to the position change in the reflector of the micro mirror (4), the corresponding light ray (33) undergoes an angle of reflection change by the angular amount and the displaced reflected light ray is illustrated as ray (35). The initial positions of the micro mirror (4) and the reflected light ray (33) are shown in FIG. 1B dotted lines. The micromechanical angular displacement is translated to a light ray displacement (Y), which is detected via the photodetector (31). In one embodiment, the imaging surface (5) of the photodetector captures the incident light rays as light spots of a specific diameter. The light spots (37, 38) are schematically illustrated in FIG. 1B as round features. In conclusion the incident radiation intensity (r) is translated via a micromechanical displacement and an optical setup into a light spot displacement (Y) on an imaging surface (5) captured by a photodetector (31).

The electromagnetic radiation detector (1) includes a radiation filter (6) which has at least one radiation filtering capability. The filter (6) may change the bandwidth, spectral intensity, etc. of the filtered radiation. In some implementations, the filter (6) can be an optical window consisting of a specific material such as Germanium, Silicon, polymer, chalcogenide glass, etc. In addition the optical window material may include optical coatings or gratings. In some implementations, the optical radiation filter (6) can be a radiation imaging lens that images incident irradiation onto the radiation absorption side of the micro mirrors (4). The filter ability is not limited to any wavelength or wavebands. For example the radiation filter (6) may be a Germanium imaging lens including an antireflective optical coating for the long wave infrared region (LWIR). Another example can include only a plane Silicon optical window covered with a narrowband optical transmission coating that is transparent only to a specific wavelength. The latter example can be used as a gas sensor or for multiband sensing with several detectors, where each detector is sensitive to one specific wavelength. First example can be used for example for thermal imaging of human presence.

In one embodiment, the radiation filter (6) is an exchangeable part of the electromagnetic radiation detector (1). For example, one radiation filter (6), which is highly transparent in the LWIR region can be manually or automatically exchanged with a radiation filter (6) that is, for example, transparent for only the mid wave infrared (MWIR) region. With such apparatus the end user has a liberty to easily and conveniently adapt the detector to the detecting and sensing needs of the users.

In one embodiment, the radiation filter (6) includes one or more spectral filtering abilities. The radiation filter (6) includes multiple parts (6a, 6b, 6c) having different transmissivities from each other. The sizes or the two-dimensional layout of the parts are not restricted by the illustration shown in the drawings. For example, the part (6a) can be transparent only to 5 μm wavelength and the window (6b) can be transparent to only 10 μm wavelength. Such apparatus enables multi-spectral sensing and imaging within one detector. The spectral filtering abilities can be achieved either through material selection, optical coating or a combination of both. In some implementation two or more different materials can be combined together to form the radiation filter (6). The filtering ability can be selected with regard to the designated application fields and/or to the sensing and detecting needs of the users.

In one embodiment, an optical filter (e.g., the linear variable filter (10)) is integrated into the lens or collimator (3). For example, a linear variable neutral density filter is integrated on the backside of a collimating biconvex lens (3). The shape of the lens including a filter is not limited to a biconvex lens. It can include any kind of optical element for collimating and then filtering the incident light from the light source (2).

In some implementations the lens or collimator (3) can include more than one element. It is not limited to a collimating biconvex, planoconvex or Fresnel lens. In some implementations the light source (2), the lens or collimator (3), and the filter (10) can be one integrated element. Such an element can generate a structured light pattern with a gradient light characteristic in one dimension.

In one embodiment, the detector (1) has an adjustable reflected light ray length. The amount of the captured light ray displacement (Y) by the micro mirror (4) depends on the light ray length L and the angle of incidence (q). Adjusting the reflected light ray length results in the adjustment of the radiation measuring sensitivity and measuring range.

The mechanism (50) to adjust the position of the imaging surface (5) relative to the mirror plane (19) along the initial reflected readout light ray lengths, in a manner that all reflected readout light ray lengths remain substantially identical in length at an initial state, is not limited to a specific embodiment. The mechanism can include rails with manual position fixation elements or it can include an automated drive, which can adjust the position automatically.

In some embodiments, the detector (1) includes not only a housing (99), a light source (2), a collimator (3) with an optical filter (10), an array of micro mirrors (4), a photodetector (31) or a screen (31a) with a camera (90), a radiation filter (6), and/or a signal processing unit (7), but also a communication module, a battery, an radiation imaging lens and additional sensor or multi-sensor module including a visual camera for capturing the scene monitored by the micro mirrors (4). In some embodiments, the detector (1) further includes a plural of radiation filtering zones having different transmission characteristics for the simultaneous detection in different wavelengths and bandwidths. Further the radiation filter/lens (6) can be fixed with, for example, a retaining ring. The fixation with a retaining ring is only exemplary and other methods for attaching and exchanging the radiation filter/lens (6) can be used.

In FIG. 3A, the signal processing unit (7) is disposed inside the housing (99). The signal processing unit (7) processes the reflected light spot displacements and generates corresponding electrical signal gains. The signal can be further processed and for example displayed to the end used via an external display. A display and a user interface can be also part of the detector. Further, the signal processing unit (7) can be disposed outside the housing (99) in some embodiments. It can be located externally to the housing (99) and be connected to the photodetector (31) via a wired or wireless connection.

The signal processing unit (7) can be programmed for customized processing of designated applications. For example, for gas sensing applications, the signal processing unit (7) can be programmed in such manner, that an alarm is triggered when a certain wavelength (e.g. corresponding to detection via the filter (6a)) rises or falls below a certain value. For example, an IR light source can be directed onto the portion of the micro mirrors (4) covered by the filter (6a); and if its detected radiation intensity falls below a certain threshold, then the traceable gas is present in the line of sight. As an example, the filter (6a) can be highly transparent to only a bandwidth of about 4.6-4.9 μm for carbon monoxide concentration detection. Such spectroscopy measurement method is just one example of the possible uses of the detector (1). The other two filters (6b and 6c) this example can be for example MWIR and LWIR transparent respectively.

In one example, the processed signal is transmitted through a communication port wirelessly to a portable device, where the end user can see the generated signals and has the ability to control or interact through a user interface with the detector. The signals can be transmitted and exchanged through any wired or wireless transmission method, using e.g. a USB, Bluetooth, Wi-Fi, etc. The end user's display and interface can include any device, for example a smartphone, tablet, laptop computer, etc.

In one embodiment, the detector (1) includes a multi-sensor module that includes an array of sensors that additionally detect different physical properties in the surroundings of the detector (1). For example the multi-sensor module can include a visual imager to capture the detected radiation scenery in the visual band. Further it can include a temperature, humidity and air-pressure sensor. Further it can include a microphone or actuators such as a speaker. As a portable device it can include an acceleration sensor, a position sensor, GPS-module, etc. The sensor module is not limited in the amount or the method of example sensing and actuating devices discussed herein.

In one embodiment, the detector (1) further includes an energy generating unit such as a solar cell, wind turbine, etc. to power the operation of the detector (1). Further, it may include an energy-storing unit such as a battery and/or a user interface. It can also include a data storage unit where processed or raw data may be stored. For example, the detector (1) can include a small solar panel, an exchangeable and chargeable battery and an adapter for a memory card.

In one embodiment, the imaging lens of the radiation filter (6) focuses electromagnetic radiation onto the array of the micro mirrors (4). The imaging lens is demonstrated in this embodiment for schematic purposes only. In some implementations, the imaging lens can include more than one element to focus and image the electromagnetic radiation onto the array of micro mirrors (4). A lens configured for two- or multi-element radiation imaging, referred to as an objective or optical imaging system, can also be used.

One embodiment disclosed herein includes a calibration method. The method starts with reading and storing the initial position of each light spot on the imaging surface (5) in an initial state. Each light spot is initially reflected of the reflecting top surfaces of each micro mirror (4) in an initial, defined irradiated state. Then, the array of the micro mirrors (4) is illuminated with specific calibrated radiation intensity to cause the light spots to change their positions on the imaging surface (5). The new calibrated positions are read and stored. The initial positions can be set as a value for a first defined incident radiation and the calibrated positions for a second defined and calibrated value of incident radiation. Since the responding behavior of the light spot displacement can be linear relative to the radiation, a measured light spot position between the initial position and the calibrated position represents the corresponding fraction of calibrated incident irradiation. This method can be referred to as a two-point calibration of the electromagnetic radiation detector 1. This is one example of how the light spot displacement, which represents an incident radiation intensity value, is converted into an electrical signal gain for signal processing. In some implementations a one-point or multi point calibration method can be applied for calibrating the detector (1).

Patterned Mask

In one embodiment, the systems and methods discussed above can be further improved via the use of a patterned mask to measure rotations of micro mirrors that can be configured to rotate proportionally to absorbed electromagnetic radiation energy. The illumination of the micro mirrors is configured to generate a patterned image on an imaging surface. The patterned image can be generated by projecting a patterned image on the micro mirrors for reflection onto the imaging surface, and/or generated by patterns formed on the micro mirrors. A rotation of a micro mirror, driven by the absorbed electromagnetic radiation energy, causes a distortion and/or displacement of a patterned image formed by light reflected by the micro mirror. The distortion and displacement are functions of the rotation of the micro mirror; and the rotation of the micro mirror is a function of the electromagnetic radiation onto the micro mirror. A camera is configured to capture the patterned image, analyze the image to determine the distortion and/or displacement and thus compute the electromagnetic radiation provided on the micro mirror based on the detected distortion and displacement of the patterned image and predetermined functions between distortion (and/or displacement) and the electromagnetic radiation intensity.

For example, the patterned masks can be used in combination with the above discussed techniques to individualize the light spots of the micro mirrors, such as the techniques to individualize the reflected light spots of the micro mirrors (4) via the linear variable filter (10), the shape and/or size of the micro mirrors (4), and/or different optical characteristics of the light reflecting areas (13) of the micro mirrors (4). Alternatively, the patterned masks can replace the techniques to individualize the reflected light spots, since the patterns can also be configured to individualize the light spots.

FIGS. 4-7 show the use of patterned masks to measure the rotations of micro mirrors according to one embodiment.

Figure 4:
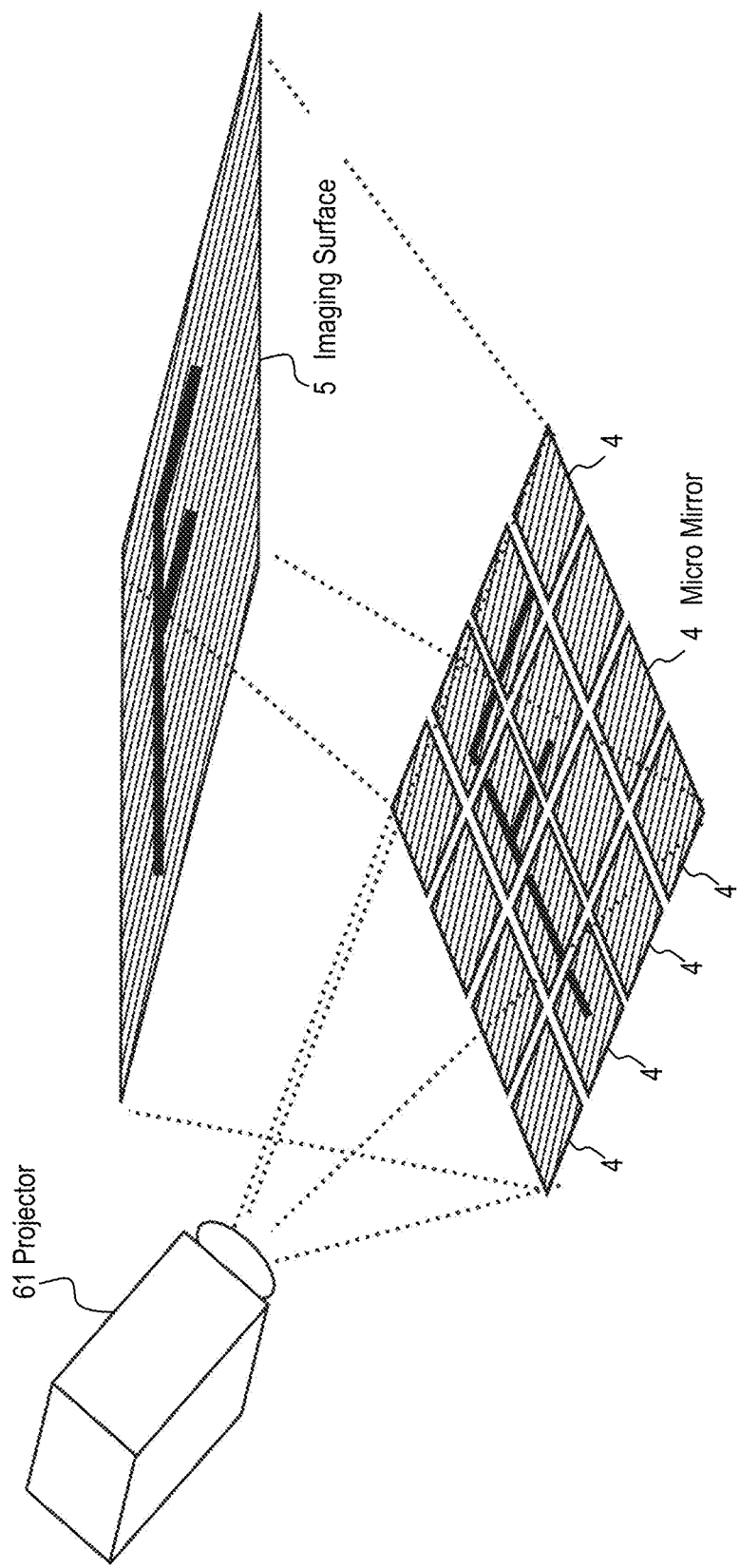
FIGS. 4-7 show the use of patterned masks to measure the rotations of micro mirrors according to one embodiment.

In FIG. 4, a mask projector (61) is used to project a patterned mask onto the micro mirrors (4). The micro mirrors (4) reflect the patterned mask onto the imaging surface (5) for detection by the photodetector (31) (e.g., illustrated in FIGS. 1A, 2A-2B, and 3A). Alternatively, the patterned mask can be reflected onto a screen (31*a*), as illustrated in FIG. 3B or 3C; and a remote camera (90) can be used to capture the image formed on the imaging surface (5) of the screen (31*a*).

Figure 5:
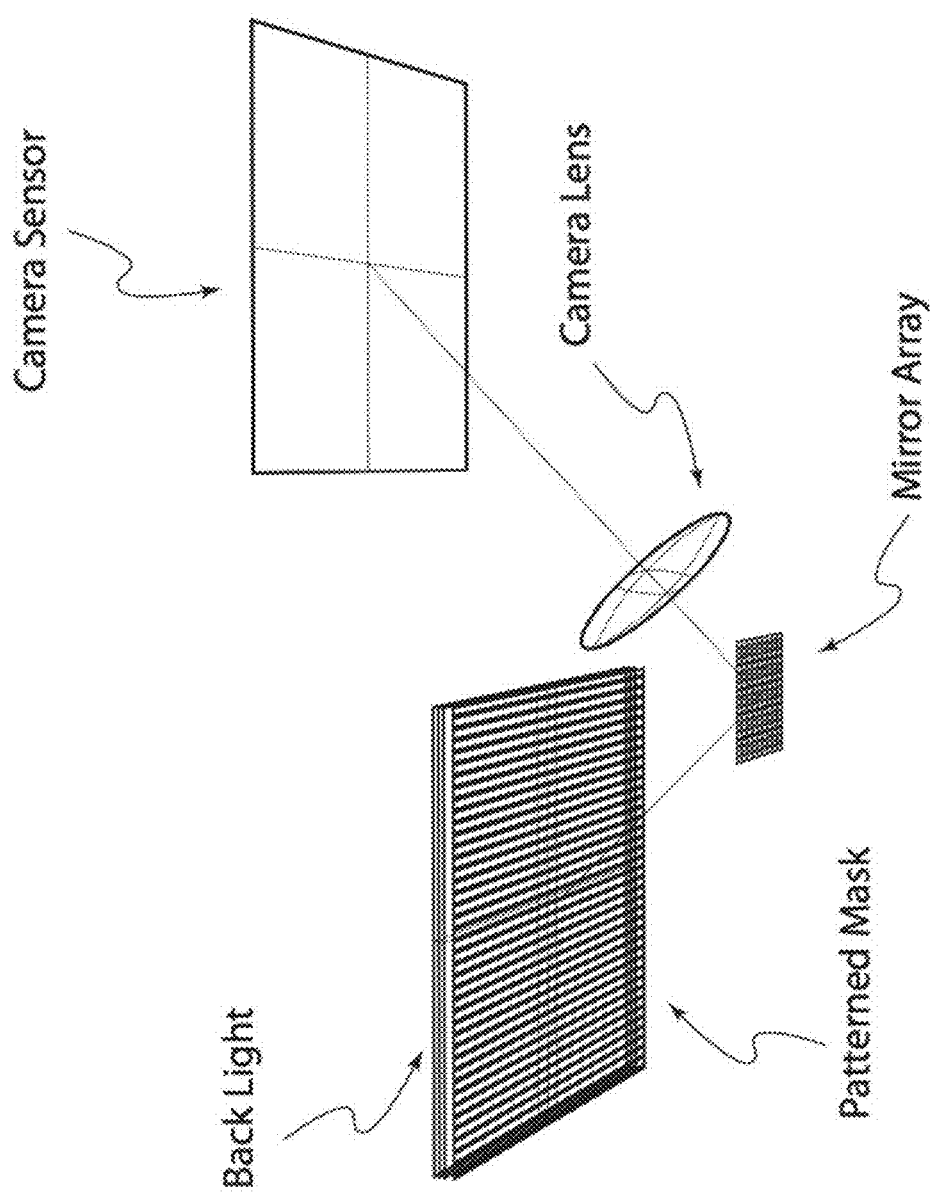

For example, in FIG. 5, the back light is projected on the mirror array through the patterned mask. The back light may be uniform, or have variations in light intensity as generated by a filter, such as the linear variable filter (10). The pattern on the mirror array can be captured using the camera sensor using the camera lens.

In some embodiments, the camera lens is used to capture a patterned image reflected by the mirror array on an imaging surface (5), such as a semi-transparent screen (31*a*). In other embodiments, the camera lens can be configured to form an image of the pattern on the mirror array directly onto the camera sensor (e.g., without focusing on a screen between the mirror array and the camera sensor).

In some embodiments, the patterned image on the imaging surface for each of the light spots reflected by a corresponding micro mirror (4) is at least in part generated by a pattern of optical characteristics (e.g., patterns in light reflection rate) of the light reflecting area (13) of the corresponding micro mirror (4).

Figure 6A:
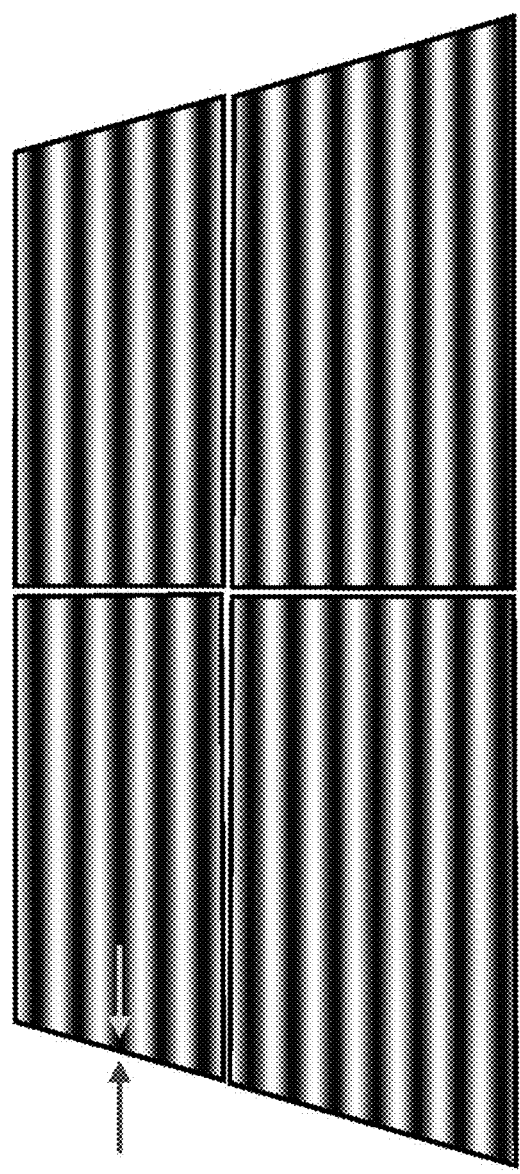
Figure 6B:
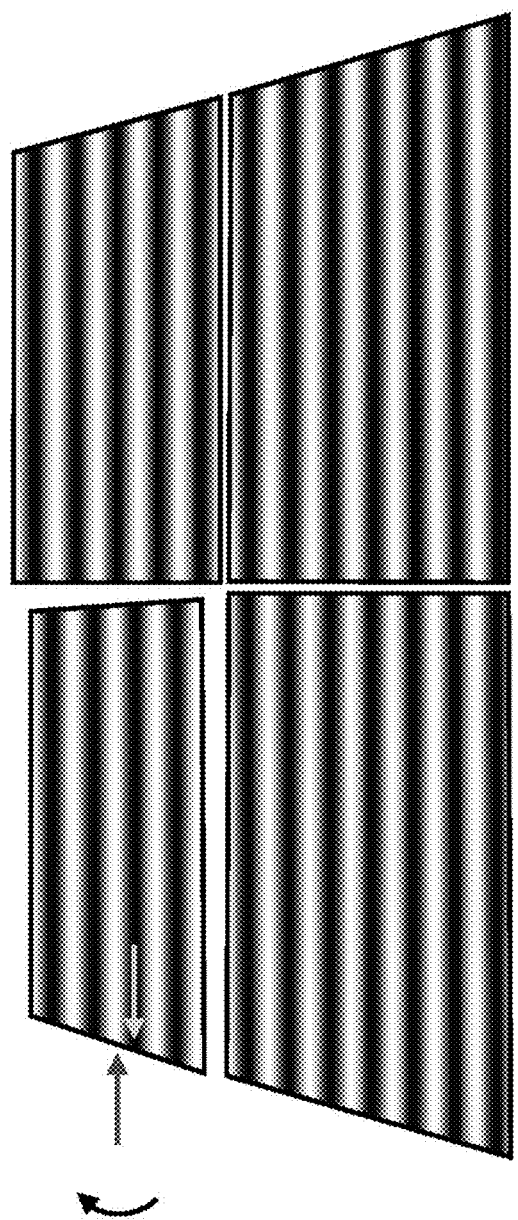

FIG. 6A shows an example of four micro mirrors, each having a visible patterned image. FIG. 6B shows an example of the four micro mirrors in which one of the micro mirrors has rotated an angle relative to the initial position as illustrated in FIG. 6A. The rotation causes a change in the observed pattern on the micro mirror. The change can be detected by directly capturing the patterned image on the micro mirrors, or an image of the light spots generated by the micro mirrors reflecting the incoming lights and thus the patterns onto an imaging surface of a screen (31*a*) or a photodetector (31). The pattern change (e.g., in the change of the spacing between the lines in the pattern) corresponds to the angle of the rotation of the micro mirror. Thus, the rotation of the micro mirror and the intensity of the radiation (r) on the micro mirror can be computed from the detected change in the pattern.

Figure 7:
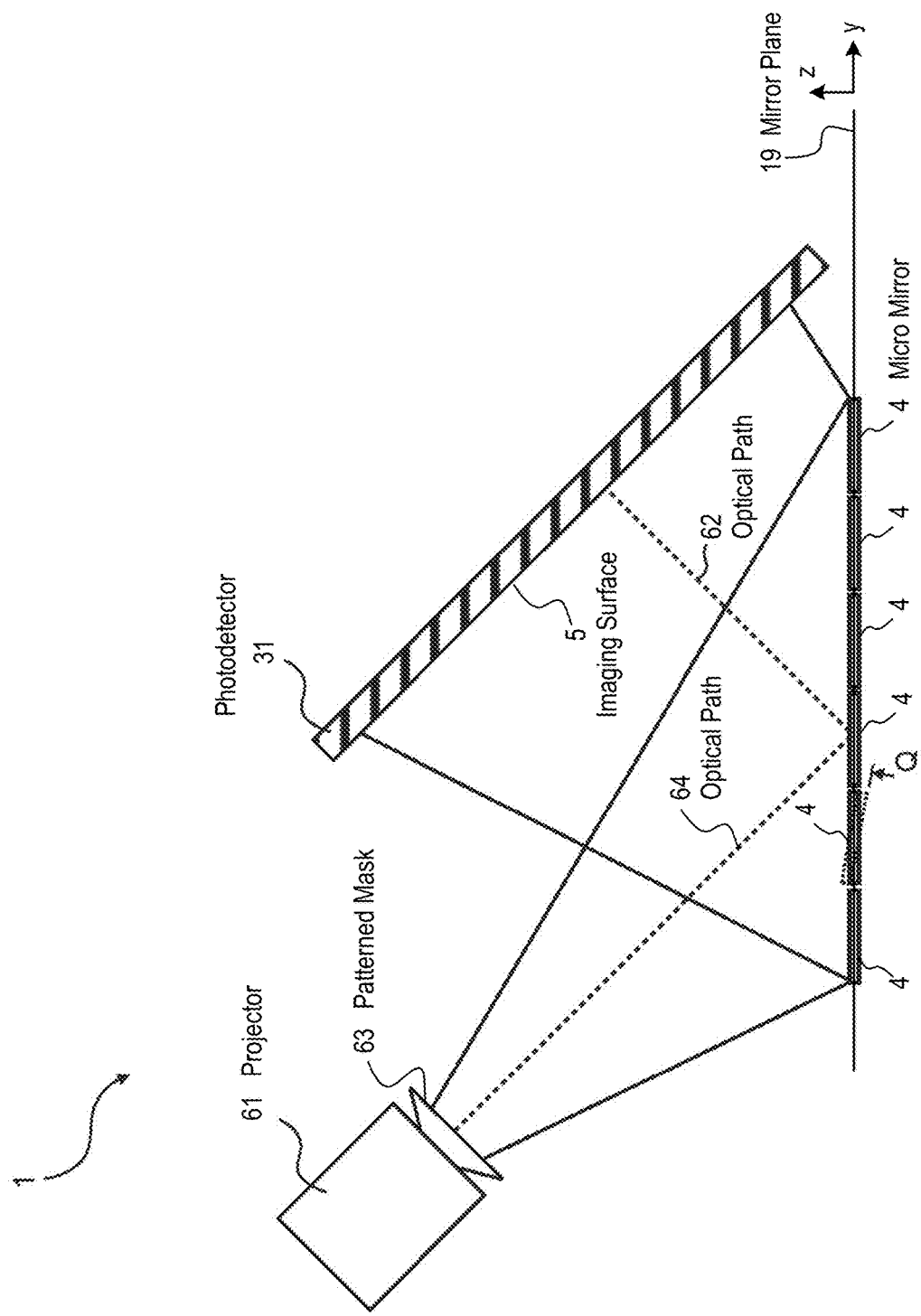

FIG. 7 illustrates an example of mounting the patterned mask (63) substantially perpendicular to the optical path (64) between the micro mirrors (4) and the projector (61) (or a light source). When the imaging surface (5) is not in parallel with the mirror plane (19), it is preferred to optimize the positioning of the imaging surface (5) to reduce the variation of the light spot displacements of the micro mirrors (4) when the micro mirrors (4) rotate the same predetermined amount.

Figure 8:
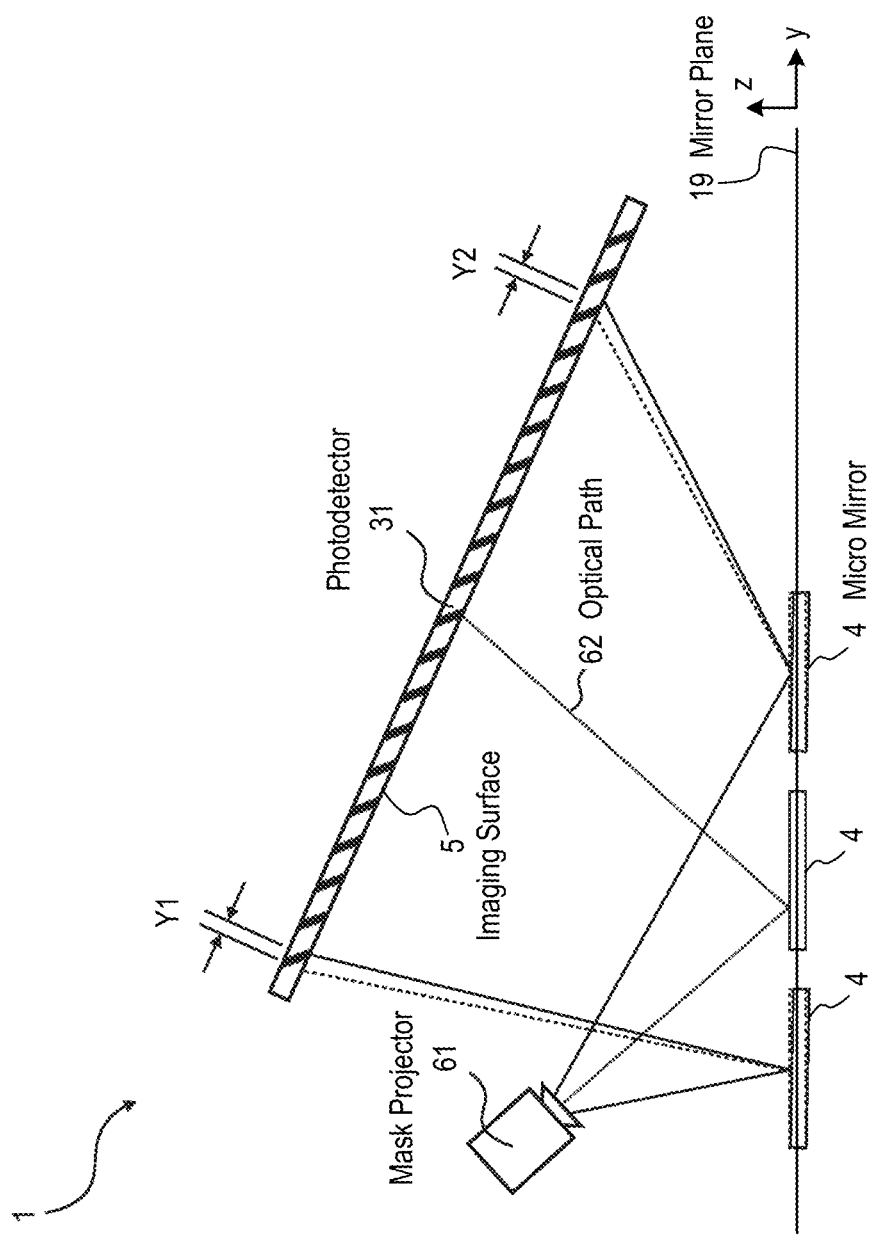
FIG. 8 shows an arrangement of an imaging surface in relation with an array of micro mirrors according to one embodiment.
Figure 9C:
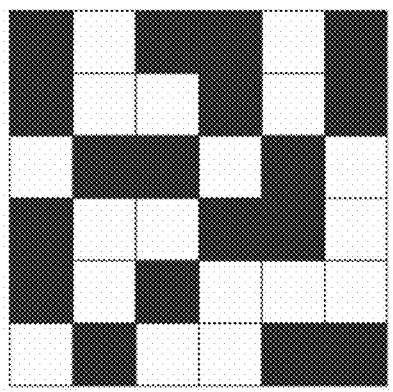
FIGS. 9A-9C and FIGS. 10-11 illustrate various mask patterns that can be used in measurement of mirror rotations according some embodiments.
Figure 9B:
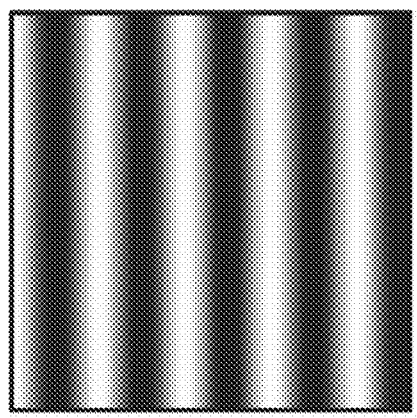
Figure 9A:
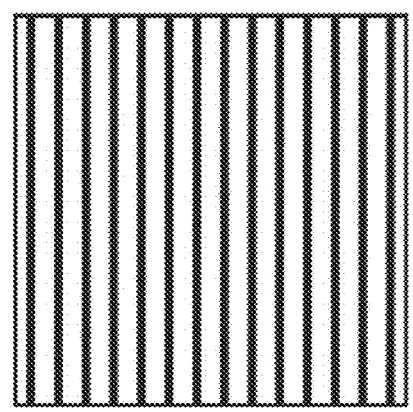
Figure 11:
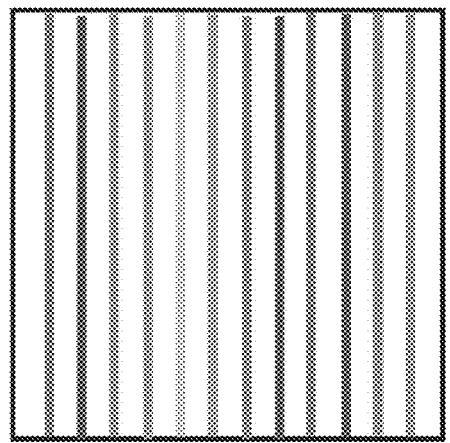
Figure 10:
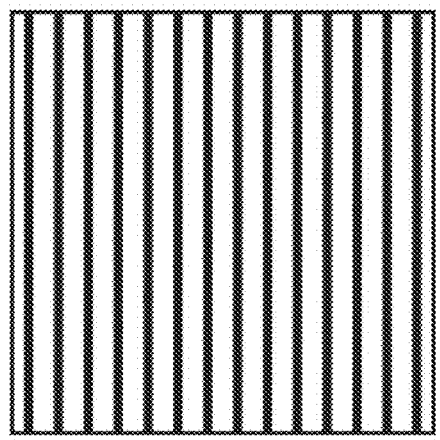

FIG. 8 shows an arrangement of an imaging surface in relation with an array of micro mirrors according to one embodiment. In FIG. 8, the imaging surface (5) is positioned such that when the two outermost micro mirrors (4) in a row rotate the same angle, their light spots has the same displacements (e.g., Y1=Y2).

FIGS. 9A-9C and FIGS. 10-11 illustrate various mask patterns that can be used in measurement of mirror rotations according some embodiments. The patterns are configured to allow an image processor to detect the deformation of the pattern observed on the micro mirrors and/or in the light spot reflected by the micro mirror. Further, different patterns can be used for different mirrors to assist the identification of mirrors that produced the light spots.

The patterns may include lights of different colors and/or shades, lines of different spacing, blocks of different placements, etc.

Thus, one embodiment of the disclosure provided herein includes a method and apparatus having an optical setup that allows a simple, convenient, inexpensive and remote detection of angular changes of a reflective surface, or a multiplicity of reflective surfaces arranged in an array. Such reflective surfaces can be for example mirrors or micro-mirrors or micro-mirror arrays which can rotate about a known axis of rotation due to some external means.

The optical setup includes a patterned image on the reflective surface. An amount of change in the patterned image on the surface, or reflected by the surface, corresponds to an amount of rotation of the surface. The change in the patterned image can be measured from a photo image of the pattern.

In one embodiment, an apparatus includes a patterned mask, a light source to illuminate the mask and project the pattern of the mask onto an array of surfaces, where each of the surfaces are configured to rotate (e.g., in response to received infrared radiation). A camera having a lens and an imaging sensor is used to capture the pattern on the array of surfaces or the pattern reflected onto an imaging surface by the array. An image processor is configured to analyze the change in the pattern captured by the camera, and calculate the deflection or rotation of the surfaces in the array.

In one embodiment, the camera uses its camera lens to image onto its camera sensor the reflection of the mask in the mirrors. The mirrors or the mirror array forms a mirror plane. In some implementations the mirror plane can run through the center of gravity of each mirror, while each mirror is positioned with an angle to the mirror plane (e.g., as illustrated in FIG. 2B), or in parallel with the mirror plane (e.g., as illustrated in FIG. 2A). The mirrors have substantially parallel axes of rotation which axes are parallel to the mirror plane. With all mirrors aligned in the same direction the mirrors can act as a single mirror.

If one or more mirrors in the mirror array is deflected, the region of the mask imaged by the camera through the reflection of that mirror changes. The image patterns are configured to allow image analysis techniques to measure the changes and thus the deflection angles of the mirrors.

For example, a striped pattern mask can be utilized with the lines the patterns substantially parallel to the axes of rotations of the mirrors. Each mirror is configured to reflect a number of stripes/lines (e.g., 2-4 or more) of the pattern. The patterned mask can be positioned in such arrangement that the stripe patterns are parallel to the axis of rotation of the mirrors. The camera images the pattern through the reflection in the mirrors and the pattern appears steady if the mirrors are steady. If one or more mirrors displace, the camera will capture the change of the pattern of the moved mirror. From the measurements of the displacement or the movement of the pattern due to mirror deflection, the angular mirror changes are calculated.

In some implementations the mask can be positioned in such arrangement that it is perpendicular to the off-the-mirror-reflected optical axis, as illustrated in FIG. 7. In other some implementations the mask can be arranged in such matter that mirrors at least three corners of the mirror array have a substantial equivalent image shift and/or pattern distortion/change at a substantial equivalent displacement angle (e.g., as illustrated in FIG. 8).

The pattern of the mask can include black-and-white stripes (e.g., FIG. 9A) or a sinusoidal pattern of same periodicity (e.g., 9b). In some implementations the periodicity can be adjusted so substantially equivalent mirror rotations result in a substantially equivalent "pattern movement" as seen by the camera in a specific arrangement by adjusting the spatial frequency (e.g., the spacing of the stripes or lines) of the pattern to the apparatus arrangement, or it can measure the phase shift. Further, in some implementations the pattern can be a pseudo-random pattern such as a noise pattern illustrated in FIG. 9C to identify the individual mirrors. In some implementations the pattern can be "coded" where each mirror location can be identified by a designated pattern mark in order to create non-ambiguous signals. Such coded pattern can include for example color coding, grey scale coding, intensity or sinusoidal pattern with wavelength variations (spatial frequency). With a coded pattern the camera does not need to "monitor constantly" the pattern and eventually "count" the pattern shift, but can only record the "end position" and the angular mirror displacement can be determined from the "end position" of the light spots.

In some implementations the pattern mask can be printed on a paper or a semi-transparent window. The mask can be illuminated through, for example backlight illumination or it can be illuminated from the frontside or the side of the optical path (64) or through other means. The light for the frontside illumination can be integrated in the camera. Further, the mask can have structured patterns and can be illuminated in such way that the structuring forms a shadow in order to create a visual contrast. The mask can also be a display, such as a LCD and can create an image that can by dynamic, in order to alter the pattern for sensitivity vs dynamic range adjustment—it can alter spatially or temporally or both. Further the mask can be projected onto an imaging plane (e.g. paper) remotely.

In one embodiment, the image processor is configured to process sinusoidal pattern (with no coding) by: capturing an image with reference image positions under known conditions; capturing image under operating condition; identifying center image regions from each mirror, using phase analysis methods (such as Fourier fringe analysis) to determine the relative phase shift in the center of the region imaged by each mirror in the reference and the operating images, and converting the phase shifts to mirror deflection angles.

In one embodiment, the image processor is configured to perform calibration for processing of radiation imager sinusoidal pattern (with no coding) by: capturing image of non-irradiated state (closed shutter between detector and calibrated blackbody source); opening shutter and recording the image shift of each mirror to the end position; recording the image shift at the defined end position; and saving beginning and end positions and calculate the difference between the positions.

Sensitivity

The sensitivity and/or precision of the electromagnetic radiation sensing apparatus (1) discussed above can be dynamically adjusted (e.g., based on a user request) by changing the methods to measure the positions of the light spots of the micro mirrors captured in an image of the imaging surface. A less computationally demanding method can be implemented in a processor provided in the electromagnetic radiation sensing apparatus (1), and a more computationally demanding method can be implemented on a separate device, such as an auxiliary device connected physically to the electromagnetic radiation sensing apparatus (1) or connected in a local area network or a remote server connected in the Internet.

In the electromagnetic radiation sensing apparatus (1) discussed above, the radiation intensity being measured at each micro mirror (4) is a function of the displacement of the light spot reflected on to the image surface (5) by the corresponding micro mirror (4). When the light from the light source (2) shines on the array of micro mirrors (4), the micro mirrors (4) reflect the light to form the light spots on the imaging surface (5). The radiation absorbed in the micro mirrors causes the micro mirrors to rotate and thus move the light spots on the imaging surface (5). The higher the radiation intensity influx onto a micro mirror (4), the further the corresponding movement of the light spot reflected by the micro mirror (4) on the imaging surface (5). The distances of the light spots moved by the micro mirrors are a function of the responsivity of the micro mirrors (4) and the geometry of the optical system. For example, the distance of a light spot moved by a micro mirror (4) is a function of the rotation of the micro mirror (4) per unit of power absorbed in the micro mirror (4) and a function of a distance that a light spot moves per unit of micro mirror rotation.

When the physical properties of the electromagnetic radiation sensing apparatus (1) are constrained and fixated, i.e. the micro mirrors (4) the optical path between the light source (2) and the imaging surface (5) are in a constant position to another; and, further when the thermo-mechanical properties of the micro mirrors (4) and the properties of the photodetector (31) are constrained, the radiation sensitivity of the electromagnetic radiation sensing apparatus (1) is determined by the degree of precision of which the moving dots or moving patterns can be allocated.

For example, referring to FIG. 1B, the light spot (37) on the imaging surface (5) moves to position (39) by distance Y as a result of micro mirror (4) rotation. The precision of determining the displacement Y can depend on the following factors: A) the quality of the light spot as created by the system described above (e.g. size, shape, intensity of spot or pattern), B) accuracy/level of precision of detection of light spots on the image plane (5) (or photodetector (31), or camera (90), for example the performance and quality of the CMOS image sensor, its pixel size, pixel sensitivity, integration time), C) the methods used to detect the light spots and determine their displacements, and D) how much processing power is available to execute the methods.

The methods used to calculate the magnitude of dot displacements or the pattern change on the image surface (5) can have a significant impact on the sensitivity of the electromagnetic radiation sensing apparatus (1).

The image from the image plane (5) (e.g. from the photodetector (31)) can be processed on the computing device or the signal processing unit (7) as an input. Through the processing of the image obtained from the image plane (50), the computing device or the signal processing unit (7) can generate a thermal image by converting for example light spot movements, or pattern shifts, into an image representing radiation (or thermal) intensity, which can be further interpreted by the human eye or further image analysis algorithms. The computing device that performs the computation to generate the thermal image from the optical images of light spot movements, or pattern shifts, does not have to be physically attached to the electromagnetic radiation sensing apparatus (1). The optical image from the image plane (5) showing the light spot movements, or pattern shifts can be used as an input to the computing device that converts the optical image to a thermal image.

For example, when the image of the light spots on the imaging surface (5), as captured by the photodector (31), is analyzed by a relatively high performance computing device (e.g. FPGA, ASIC or processor), the positions of the light spots can be determined at a relatively high level of precision using a sophisticated, computationally intensive method. Such method can include for example a Gaussian or polynomial fit to each light spot and move the fit with the displacement of the spot on the image plane (5). The determination of a light spot fit can be very precise, thus even relatively small displacements of spots can be detected. The improved precision in measuring the positions of the light spots in the image improves the sensitivity and/or precision of the electromagnetic radiation sensing apparatus (1).

However, when the same image of the light spots on the imaging surface (5), as captured by the photodector (31), is analyzed using a relatively low-cost computing device (e.g. such as a micro-controller), the positions of the light spots can be determined using a simplified, computationally efficient method at a relatively low level of precision. Such method can include a simple threshold method of determining the light spot movements at a relatively coarse level. The reduced computation intensity allows the use of low-cost computing hardware in generating the radiation/temperature measurements, which can be implemented in the electromagnetic radiation sensing apparatus (1) to reduce the bandwidth and/or power consumption requirements in the communications over a computer network by transmitting the radiation/temperature measurements instead of the full image of the light spots.

For example, the photodetector (31) (e.g., the imaging surface (5)) can have 1000×1000 pixels, where each pixel has an area of 3 µm×3 µm. A light spot can be of, e.g., 50 µm in diameter, and for a 10 W/m2 change in thermal radiation, the resulting light spot travel can be 6.2 µm on the photodetector image surface (31). Thus, the light spot travels 6.2 µm/3 µm/pixel=2.06667 pixels. A relatively low-cost computing device may not have sufficient processing power to calculate fractions of pixel accuracy, i.e. sub-pixel accuracy. It may allow only full-pixel accuracy, meaning the detector's accuracy defined by full-pixel increments, which corresponds to 4.8 W/m2 (=10 W/m2/2.06667 pixel) steps in detection of thermal radiation (assuming the displacement is proportional to radiation influx).

A relatively high-performing computing device can have sufficient computational power to allow light spot movement detection at a "sub-pixel" precision. For example, when the light sport movement detection has a precision at 0.01 pixel increment level, the thermal radiation can be detected at the increment of 0.048 W/m2 (=4.8 W/M2*0.01 pixel). Thus, the accuracy of the method used to measure/calculate the movement of a light spot can have a significant impact on the thermal sensitivity of the thermal image device.

Distinguishing and tracing individual mirror patterns in an array can be computational demanding. In such case relatively high-performing computing device can be used to maximize each light spot's dynamic range and enable a high target temperature detection range (temperature span) as the light spots might overlap or travel beyond its intrinsic spot-to-spot pitch distance and identifying and tracing individual light spots might be necessary for high dynamic range.

To improve the precision in determining the light spot movement or light pattern changes, the computing device can optionally use computer vision or image processing analysis, such as blob detection, blob count, blob tracking, threshold detection, etc.

Averaging of images from the image plane can reduce noise and to increase accuracy in the determination of the position of a light spot. In such instances, additional computational power can be used for performing averaging and noise suppression.

The accuracy of the positions of the light spots can be dynamically adjusted based on the resolution of the image of the light spots. Increasing the resolution of the image of the light spots can improve the sensitivity and/or precision, as well as the computation involved, the bandwidth for transmission of the image, and/or the power consumption in computation and/or transmission.

In some implementations, the resolution of the light spot images transmitted from the electromagnetic radiation sensing apparatus (1) can be dynamically adjusted to balance the bandwidth and/or power usage in communication and measurement sensitivity/precision.

In some implementations, the processor provided in the electromagnetic radiation sensing apparatus (1) dynamically selects a method used to measure light spot positions to balance the power usage in computation and measurement sensitivity/precision.

In some implementations, the processor controls the photodetector of the electromagnetic radiation sensing apparatus (1) to capture an image of the light spots at a selected resolution according to a selected measurement sensitivity/precision requirement.

Dynamically adjusting the sensitivity and/or precision of the electromagnetic radiation sensing apparatus (1) according to precision requirements for specific applications results in dynamical adjustment of computation cost, transmission cost, and/or power consumption, which can lead to improvement in the overall performance of the system that uses the electromagnetic radiation sensing apparatus (1).

For example, the measuring results of the electromagnetic radiation sensing apparatus (1) can be transmitted via a computer network to a separate device (e.g., a smart phone, a tablet computer, a digital media player, a desktop computer, a server) to support an application (e.g., for non-visual environment monitoring and monitoring of human presence for security and safety, energy savings, fire detection, people counting and behavior analysis). A low-cost, low performance processor can be configured in the electromagnetic radiation sensing apparatus (1) to process the image of light spots on the imaging surface (5) and transmit the radiation intensities/temperatures measured at the micro mirrors (4) for low precision applications, or to transmit the image to an auxiliary device, or a server, for high precision applications using a computation method that is beyond the computation capability of the low-cost, low performance processor. Thus, the apparatus (1) can be manufactured with an economic process; and the computation tasks that require high performance computational power can be performed on a server. The apparatus (1) sends images captured at the image plane (5) to the server through a communication connection; and, the server analyzes the images to determine the displacements of the light spots. Based on the analysis performed by the server, a graphic user interface (GUI) can be configured to provide the user with high-sensitivity thermal or radiation imagery. With such a connected solution the hardware of the apparatus (1) can be kept relatively simple and inexpensive, whilst e.g. relatively inexpensive server-cloud processing is leveraged. A relatively inexpensive, connected, high-sensitivity thermal radiation imagery solution is described.

Figure 12:
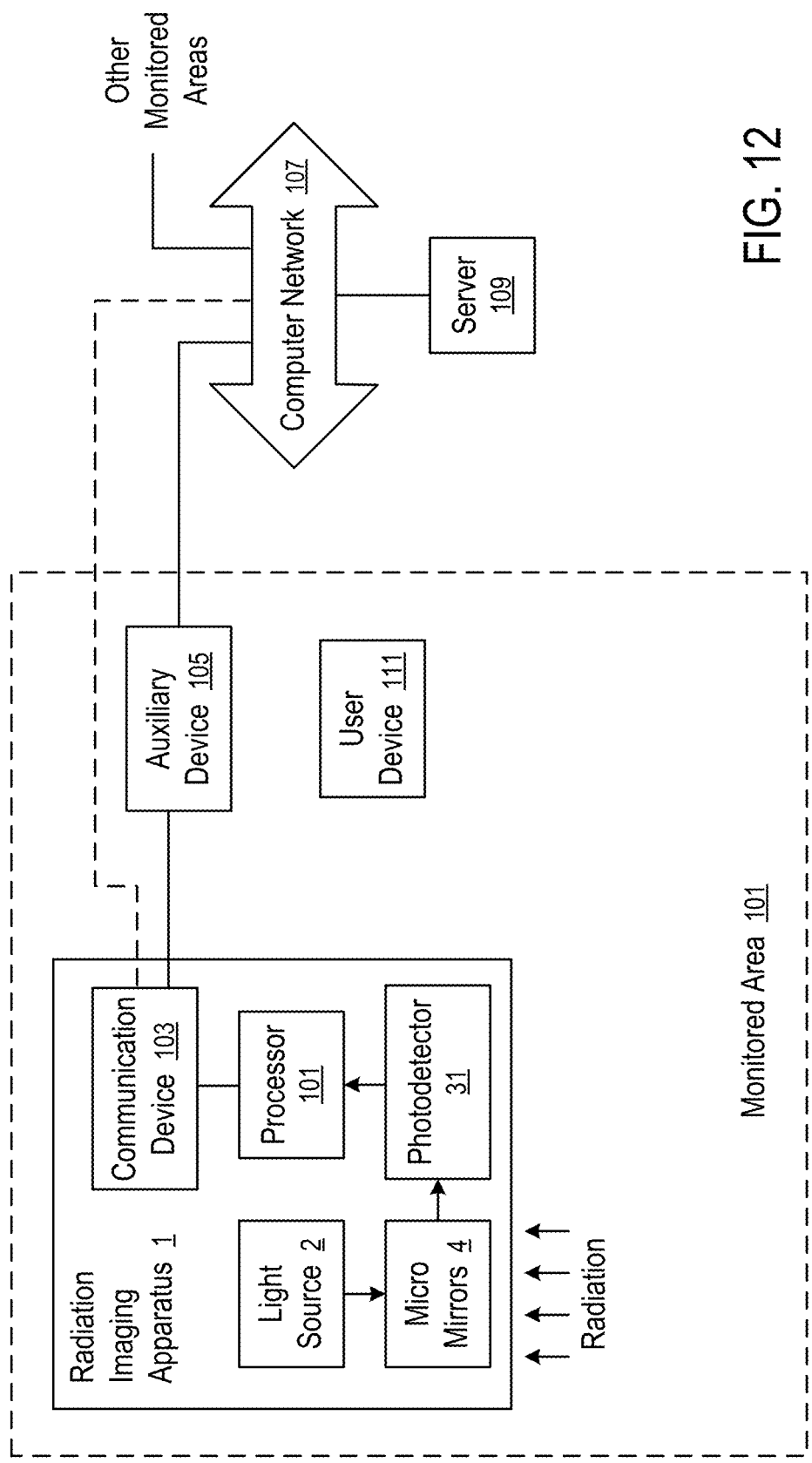
FIG. 12 shows a system to measure radiation according to one embodiment.

FIG. 12 shows a system to measure radiation according to one embodiment.

In FIG. 12, the radiation imaging apparatus (1) includes a light source (2), a set of micro mirrors (4) absorbing radiation and reflecting the light from the light source (2), and a photodetector (31) to capture an image of light spots formed on an imaging surface (5).

For example, the radiation imaging apparatus (1) in FIG. 12 can be implemented in a way illustrated in FIG. 1A, 3A-3C, 4, 7, 8, or 11, using an array of micro mirrors (4) illustrated in FIG. 1B or 1C, with different light spot characteristics illustrated in FIG. 1C, 4, 9A-9C, 10, or 11.

In FIG. 12, the radiation imaging apparatus (1) includes: a processor (101) (e.g., a microprocessor, or a field-programmable gate array (FPGA)); and a communication device (103) (e.g., a transceiver for wireless local area network, a transceiver for wireless personal area network, a transceiver for a wired communication connection).

Based on a sensitivity requirement or setting, the processor (101) chooses between: 1) processing the image from the photodetector (31) to generate radiation/temperature measurements that are transmitted via the communication device (103); and 2) transmitting, using the communication device (103), the image directly (e.g., without processing) to allow another device (e.g., 105, 109) that is connected to the communication device (103) to process the image at a precision higher than the processing precision of the processor (101).

In some instances, the processor (101) may optionally down sample the image captured by the photodetector (31) (e.g., to reduce the data amount to be communicated) according to the precision requirement for the current application of the radiation/temperature measurements. In some instances, the processor (101) instructs the photodetector (31) to capture an image of light spots of the micro mirrors (4) at a resolution optimized for the precision requirement of the current application of the radiation/temperature measurements.

In some implementations, the communication device (103) transmits the light spot image, or radiation/temperature measurements, to an optional auxiliary device (105) which may perform additional processing before transmitting the results to a remote server (109) via a computer network (107) (e.g., the Internet, an intranet, a local area network). In other implementations, the auxiliary device (105) is not used; and the radiation/temperature measurements and/or the image of the light spots are transmitted to the communication device (103) to the server (109) via the computer network (107) without intermediate processing.

Examples of the auxiliary device (105) include a personal computer, a smart home hub device, a smart phone of a user, a laptop computer, a desktop computer, a digital media play, etc.

Typically, the auxiliary device (105) and/or the server (109) has more computing power than the processor (101) and thus can apply a computational intensive method in determining the positions of the light spots with improved precision and thus sensitivity.

The server (109) is typically configured in a centralized location (e.g., hosted in a cloud computing platform) to provide services to many radiation imaging apparatuses (e.g., 1) installed at different areas (e.g., 101) monitored by the respective radiation imaging apparatuses (e.g., 1).

Based on the application of the radiation imaging apparatuses (1) (e.g., non-visual environment monitoring and monitoring of human presence for security and safety, energy savings, fire detection, people counting and behavior analysis), the server (109) may transmit notifications or alerts to a user device (111) associated with the radiation imaging apparatuses (1) (e.g., via a telecommunication network and/or Internet). The user device (111) may dynamically configure/select a service/application provided via the radiation sensing results.

In general, the user device (111) may or may not be located in the monitored area (101) to receive the notifications or alerts and/or select the application or service.

Figure 13:
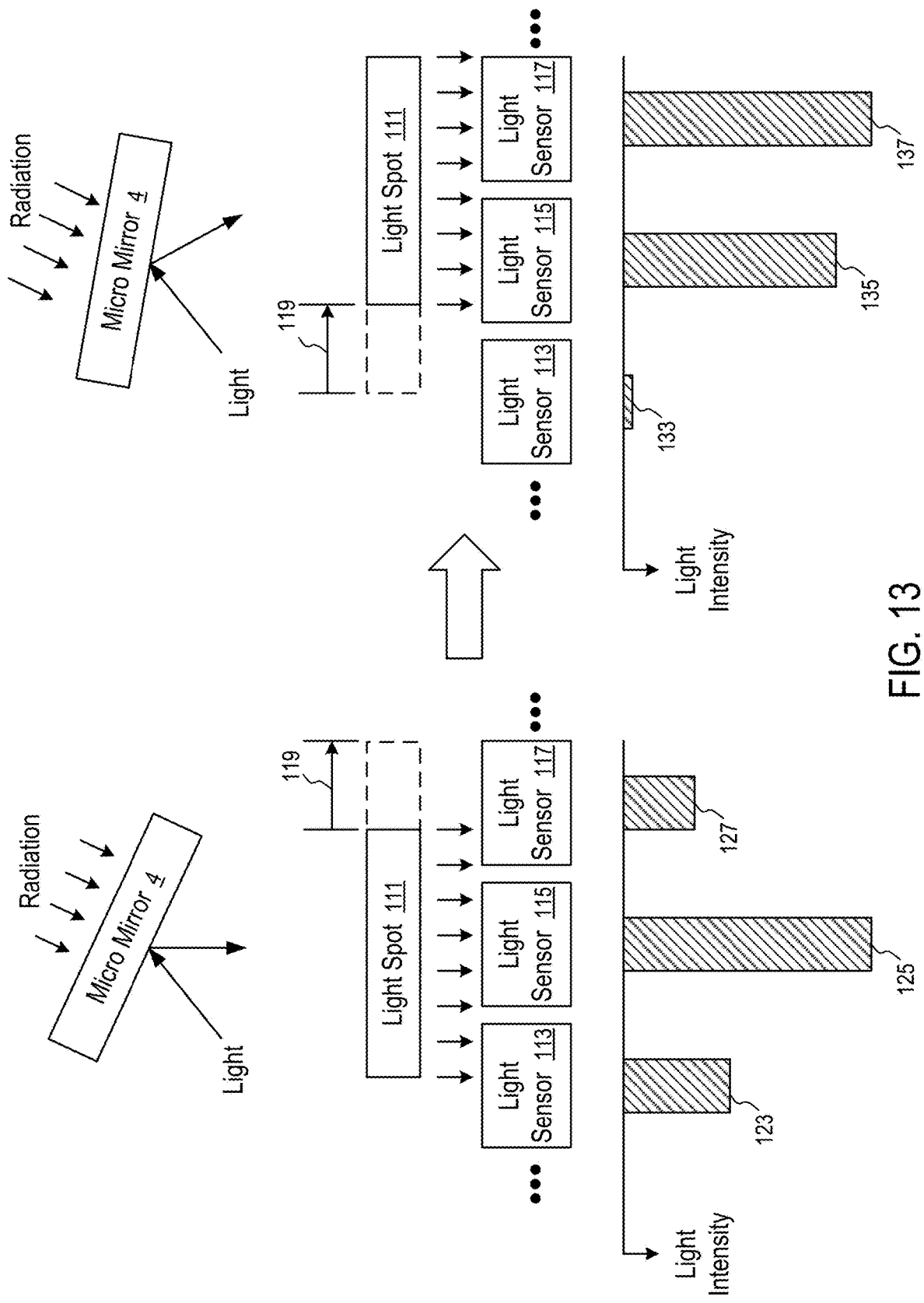
FIG. 13 illustrates the analysis of a light spot of a micro mirror for the measurement of radiation.

FIG. 13 illustrates the analysis of a light spot of a micro mirror for the measurement of radiation.

In FIG. 13, the light from the light source (2) of the radiation imaging apparatus (1) (e.g., illustrated in FIG. 12) is reflected by the micro mirror (4) to generate a light spot (111) that is captured by a set of light sensors (113, 115, 117). Each of the light sensors (113, 115, or 117) reports the light intensity (123, 125, or 127) detected at a pixel of the image of the light spot (111) on the imaging surface (5).

When the radiation to the micro mirror (4) changes, the micro mirror (4) rotates to move (119) the light spot relative to the light sensors (113, 115, 117), causing changes in the light intensity (133, 135, or 137) measured by the light sensors (113, 115, 117).

A typical light spot is captured by multiple pixels of the photodetector (31) of the radiation imaging apparatuses (1). Thus, the image of the light spot contains more data than the radiation/temperature measurement at the micro mirror (4). Data communication can be reduced by the processor (101) processing the light spot image using a low accuracy method to generate the radiation/temperature measurement at the micro mirror (4), while the sensitivity/accuracy of the radiation/temperature measurement can be improved by transmitting the light spot image to the auxiliary device (105) or the server (109) for processing using a high accuracy method.

For example, the processor (101) can use the pixels of a light spot having intensities above a threshold to identify a center of the light spot. Thus, the processor (101) may not be able to detect a light spot movement below a threshold much smaller than a pixel size of the photodetector (31).

For example, the auxiliary device (105) or the server (109) can perform a three dimensional curve fitting of the light intensities in the light spot image to calculate a light spot position at a precision much smaller than a pixel size of the photodetector (31) and thus improve sensitivity and accuracy of the calculated radiation intensity or temperature measured by the micro mirror (4). The processor (101) may not have the capability to perform the same computation using three dimensional curve fitting.

In general, any known methods for computing the position of a light spot in an image can be used. Preferably, the computationally and/or power-consumption efficient methods are implemented on the processor (101) (e.g., via hardware and/or firmware) to reduce the cost of the radiation imagining apparatus (1); and the high precision methods that are computationally and/or power-consumption intensive are implemented on the auxiliary device (105) and/or the server (109) (e.g., via software). The processor (101) is configured to dynamically determine whether to process the image of the light spots or upload the image to the auxiliary device (105) and/or the server (109) for processing, based on a setting or the precision/sensitivity requirement of the current application, such that the system as a whole can support various applications having different precision/sensitivity requirements.

Figure 14:
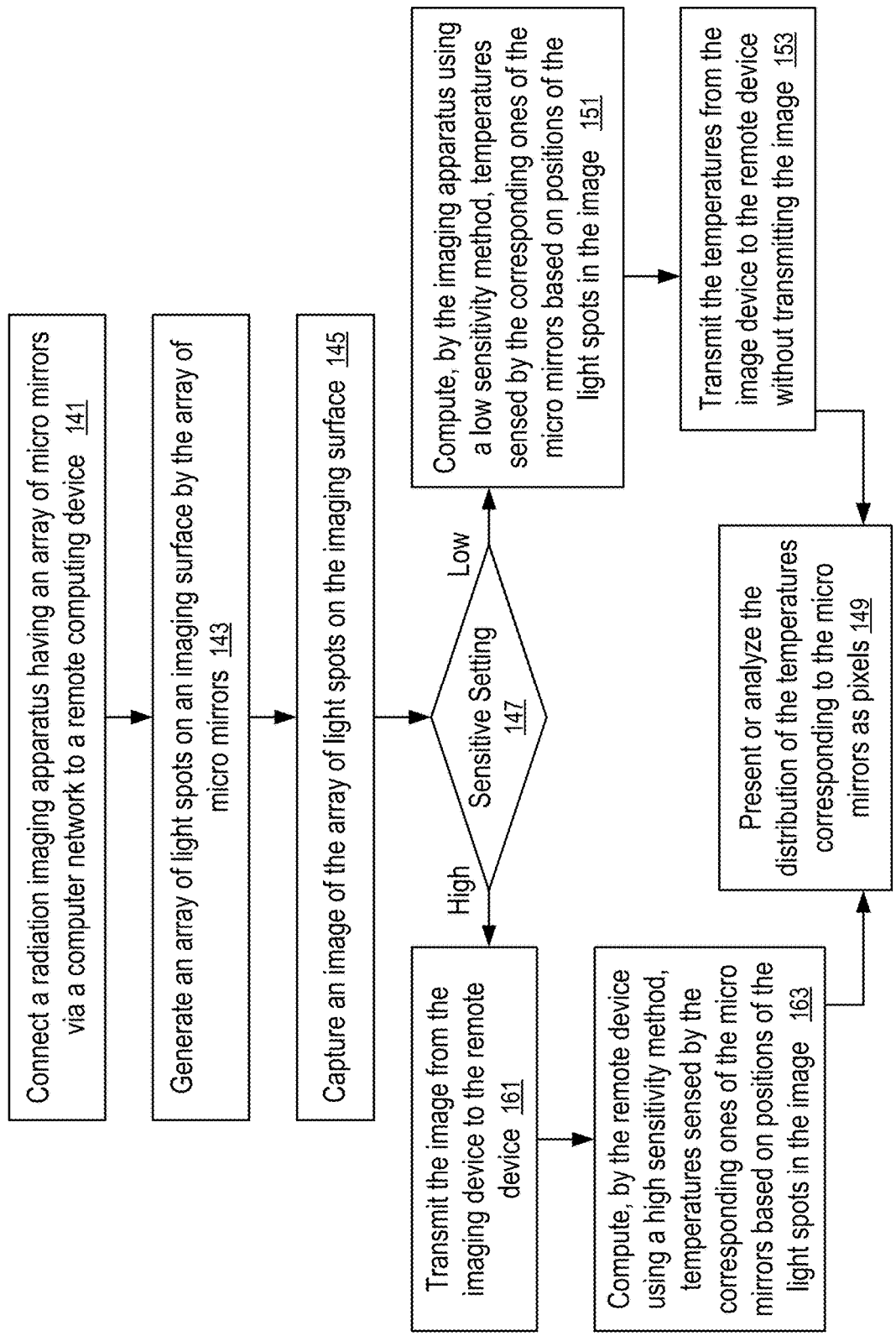
FIG. 14 shows a method to analyze an image generated via micro mirrors according to one embodiment.

FIG. 14 shows a method to analyze an image generated via micro mirrors according to one embodiment. For example, the method of FIG. 14 can be implemented in a system illustrated in FIG. 12.

In FIG. 14, a radiation imaging apparatus (1) having an array of micro mirrors (4) is connected (141) via a computer network (e.g., 107) to a remote computing device (e.g., 109). The array of micro mirrors generate (143) an array of light spots on an imaging surface (5). A photodetector (31) captures (145) an image of the array of light spots that are projected on the imaging surface (5).

A processor (101) of the radiation imaging apparatus (1) determines (147) the sensitivity setting or requirement for the current application in which the radiation imaging apparatus (1) is used. In some instances, the setting is specified by a user using a user interface presented on the user device (111) and communicated to the radiation imaging apparatus (1) (e.g., via a connection through the server (109), or a connection between the user device (111) and the communication device (103) without going through the server (109)). In other instances, the setting is automatically determined by the server (109) based on the need of the current application.

When the sensitivity setting (147) is low (e.g., within the computation capability of the processor (101)), the radiation imaging apparatus (1) computes (151), using a low sensitivity method, temperatures sensed by the corresponding ones of the micro mirrors (4) based on positions of the light spots in the image. The communication device (103) of the radiation imaging apparatus (1) transmits (153) the temperatures to the remote device (e.g., 109) without transmitting the image.

When the sensitivity setting (147) is high (e.g., outside of the computation capability of the processor (101)), the communication device (103) of the radiation imaging apparatus (1) transmits (161) the image to the remote device (e.g., 109) (e.g., without determining the temperatures from the image). The remote device (e.g., 109) computes (163), using a high sensitivity method, temperatures sensed by the corresponding ones of the micro mirrors (4) based on positions of the light spots in the image.

In some implementations, the remote device (e.g., 109) is replaced with an auxiliary device (105) located in the vicinity of the area (101) monitored by the radiation imaging apparatus (1).

The remote device (e.g., 109) may present or analyze (149) the distribution of the temperatures corresponding to the micro mirrors (4) as pixels (e.g., for non-visual environment monitoring and monitoring of human presence for security and safety, energy savings, fire detection, people counting and behavior analysis).

In one implementation, the sensitivity setting (147) for an application is low when the power consumption for the computation of the radiation intensity/temperature at a required accuracy/sensitivity is less than the power consumption for the transmission of the image of the light spots and/or the computation power required for the computation of the radiation intensity/temperature at the required accuracy/sensitivity is within the capability of the processor (101).

In one implementation, the sensitivity setting (147) for an application is high when the power consumption for the computation of the radiation intensity/temperature at a required accuracy/sensitivity is higher than the power consumption for the transmission of the image of the light spots and/or the computation power required for the computation of the radiation intensity/temperature at the required accuracy/sensitivity is beyond the capability of the processor (101).

In one implementation, the processor (101) is implemented as a low cost microprocessor or FPGA, connected to a CMOS image sensor as the photodetector (31). The processor (101) has sufficient processing power to perform a low level calculation for the conversion from each light spot movement into a thermal pixel for the light spot. The low level calculation has a restricted "resolution" in light spot position determination (e.g., resolving only to 0.3 of a pixel of the CMOS image sensor, or 1 μm light spot movement on a 3 μm pixel pitch in the CMOS image sensor). In one configuration, 1 μm light spot movement corresponds to a 0.7K (=0.7° C.) change in the measured temperature. Thus, the temperature measurement has a Noise Equivalent Temperature Difference (NETD), or sensitivity, of 700 mK=0.7K.

When the user of the radiation imaging apparatus (1) wants to increase the NETD to 100 mK NETD, the radiation imaging apparatus (1) transmits the full frame of light spots, captured by the CMOS image sensor, to an external device having stronger computation power, such as a host board, an evaluation kit, a smart phone running a customized mobile application, a server in a cloud computing platform, etc.) or ideally to the cloud as computational power is virtually limitless. The external device is configured to apply a sophisticated, computational intensive method which may apply, for example 3D curve fitting to allow detection of subpixel light spot movement that is as small as 0.05 pixels, which translates to 0.15 μm displacement detection on a 3 μm pixel pitch. As a result, the IR pixel (one dot produced by one micro mirror (4)) has a much higher sensitivity and an object temperature change of e.g. 0.1° C. can be detected, where the mirror deflects proportionally less and the light spot travels proportionally less in the imaging surface (5).

As the cloud computing cost decreases, such "high sensitivity option" can be achieved with low cost, without increasing the on-ground hardware cost, power consumption and/or complexity.

The system as illustrated in FIG. 12 allows a "modular" low cost thermal imaging setup. For example, 80% of applications may require only the low-sensitivity "ground" version but at same time it can be configured to stream the images captured by the CMOS image sensor to cloud and provide high sensitivity application for users who need it without the need of changing hardware.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
a radiation imaging apparatus, having:
an imaging surface;
a light source;
an array of micro mirrors, wherein the micro mirrors rotate according to radiation absorbed in the micro mirrors and reflect light from the light source to generate a distribution of reflected light on the imaging surface;
a photodetector, wherein the photodetector captures an image of the distribution of reflected light on the imaging surface;
a processor coupled to the photodetector; and
a communication interface coupled with the processor; and
a computing device located separately from the radiation imaging apparatus and in communication with the communication interface;
wherein in a first application of the system, the processor determines from the image first positions of light reflected by the micro mirrors on the imaging surface and computes first intensities of the radiation absorbed at the micro mirrors, and the communication interface transmits the first intensities to the computing device; and
wherein in a second application of the system, the communication interface transmits the image of the distribution of reflected light to the computing device, and the computing device determines from the image second positions of light reflected by the micro mirrors on the imaging surface and computes second intensities of the radiation absorbed at the micro mirrors;
wherein for the second application of the system, the communication interface transmits the first intensities without transmitting the image of the distribution of reflected light on the imaging surface.

2. The system of claim 1, wherein for the second application of the system, the image of the distribution of reflected light is transmitted from the radiation imaging apparatus to the computing device without the processor determining from the image positions of light reflected by the micro mirrors on the imaging surface.

3. The system of claim 1, wherein the computing device is one of:
- a server hosted on a cloud computing platform and connected to the communication interface via a computer network;
- an auxiliary device connected to the communication interface; and
- an auxiliary device connected to the communication interface via a computer network.

4. The system of claim 1, wherein the first intensities are computed with a first sensitivity level in measuring radiation; the second intensities are computed with a second sensitivity level in measuring radiation; and the second sensitivity level is higher than the first sensitivity level.

5. The system of claim 4, wherein the first intensities are computed using a first method of measuring light spot positions from the image; the second intensities are computed using a second method of measuring light spot positions from the image; and
  the second method is more computationally intensive than the first method and is more accurate in position results.

6. The system of claim 5, wherein the second method determines a position of a light spot in the image using three dimensional curve fitting of an image of the light spot.

7. The system of claim 1, wherein the processor is a microprocessor or a field-programmable gate array (FPGA); and the photodetector is a CMOS image sensor.

8. A radiation imaging apparatus, comprising:
- an imaging surface;
- a light source;
- an array of micro mirrors, wherein the micro mirrors rotate according to radiation absorbed in the micro mirrors and reflect light from the light source to generate light spots on the imaging surface;
- a photodetector, wherein the photodetector captures an image of the light spots reflected on the imaging surface by the micro mirrors;
- a processor coupled to the photodetector; and
- a communication device coupled to the processor;
- wherein when in a first setting:
  - the processor determines from the image first positions of the light spots on the imaging surface, and computes first intensities of the radiation absorbed at the micro mirrors;
  - the communication device transmits the first intensities; and
  - the communication device transmits the first intensities without transmitting the image of the light spots; and
- wherein when in a second setting:
  - the communication device transmits the image of the light spots; and
  - a computing device receiving the image determines from the image second positions of the light spots on the imaging surface, and computes second intensities of the radiation absorbed at the micro mirrors.

9. The radiation imaging apparatus of claim 8, wherein when in the second setting, the image of the light sports is transmitted from the radiation imaging apparatus to the computing device without the processor determining from the image positions of the light spots on the imaging surface.

10. The radiation imaging apparatus of claim 8, wherein the computing device is one of:
- a server hosted on a cloud computing platform and connected to the communication device via a computer network;
- an auxiliary device that is separate from the radiation imaging apparatus and connected to the communication device; and
- an auxiliary device connected to the communication device via a computer network.

11. The radiation imaging apparatus of claim 8, wherein the first intensities are computed with a first performance level in measuring radiation; the second intensities are computed with a second performance level in measuring radiation; and the second sensitivity level is higher than the first sensitivity level.

12. The radiation imaging apparatus of claim 11, wherein the first intensities are computed using a first method of measuring light spot positions from the image; the second intensities are computed using a second method of measuring light spot positions from the image; and the second method is more computationally intensive than the first method and is more accurate in position results.

13. The radiation imaging apparatus of claim 12, wherein the second method determines a position of a light spot in the image using three dimensional curve fitting of an image of the light spot.

14. The radiation imaging apparatus of claim 13, wherein the first method determines a position of a light spot in the image without using three dimensional curve fitting of an image of the light spot.

15. A method, comprising:
- rotating micro mirrors of a radiation imaging apparatus according to radiation absorbed in the micro mirrors;
- directing light from a light source of the radiation imaging apparatus on the micro mirrors which reflect the light to generate light spots on an imaging surface;
- capturing, by a photodetector, an image of the light spots reflected on the imaging surface by the micro mirrors;
- when the radiation imaging apparatus is in a first setting:
  - determining from the image, by a processor coupled to the photodetector, first positions of the light spots on the imaging surface;
  - computing, by the processor, first intensities of the radiation absorbed at the micro mirrors; and
  - transmitting the first intensities computed by the processor; and
- when the radiation imaging apparatus is in a second setting:
  - transmitting the image of the light spots to a computing device separate from the processor, wherein the computing device:
    - determines from the image second positions of the light spots on the imaging surface; and
    - computes second intensities of the radiation absorbed at the micro mirrors;
  - wherein when in the first setting, the image of the light spots is not transmitted from the radiation imaging apparatus that transmits the first intensities; and when in the second setting, the processor does not determine from the image positions of the light spots on the imaging surface.

16. The method of claim 15, wherein the first intensities are computed using a first method of measuring light spot positions from the image; the second intensities are computed using a second method of measuring light spot positions from the image; and
  the second method is more computationally intensive than the first method and is more accurate in position results.

17. The method of claim 16, wherein the second method determines a position of a light spot in the image using three dimensional curve fitting of an image of the light spot; and the first method determines a position of a light spot in the image without using three dimensional curve fitting of an image of the light spot.

* * * * *